(12) United States Patent
Hamaguchi et al.

(10) Patent No.: US 7,545,595 B2
(45) Date of Patent: Jun. 9, 2009

(54) MAGNETIC DISK APPARATUS HAVING AN ADJUSTABLE MECHANISM TO COMPENSATE WRITE OR HEAT ELEMENT FOR OFF-TRACKING POSITION WITH YAW ANGLE

(75) Inventors: Takehiko Hamaguchi, Odawara (JP);
Atsushi Nakamura, Koganei (JP);
Yasutaka Nishida, Kodaira (JP);
Masafumi Mochizuki, Koganei (JP);
Hideki Sawaguchi, Kokubunji (JP)

(73) Assignee: Hitachi Global Storage Technologies Japan, Ltd., Tokyo (JP)

( * ) Notice: Subject to any disclaimer, the term of this patent is extended or adjusted under 35 U.S.C. 154(b) by 75 days.

(21) Appl. No.: 11/354,912

(22) Filed: Feb. 16, 2006

(65) Prior Publication Data
US 2006/0132957 A1    Jun. 22, 2006

Related U.S. Application Data

(62) Division of application No. 10/633,621, filed on Aug. 5, 2003, now Pat. No. 7,027,248.

(30) Foreign Application Priority Data

Aug. 9, 2002   (JP) ............................. 2002-232898
May 16, 2003   (JP) ............................. 2003-138480

(51) Int. Cl.
    *G11B 5/02*    (2006.01)
(52) U.S. Cl. .............................. 360/59; 360/66; 360/75; 360/77.02
(58) Field of Classification Search ........................ None
See application file for complete search history.

(56) References Cited

U.S. PATENT DOCUMENTS

| 5,828,644 A | * | 10/1998 | Gage et al. ............. 369/112.24 |
| 5,991,113 A | * | 11/1999 | Meyer et al. .................. 360/75 |
| 6,078,454 A | * | 6/2000 | Takahashi et al. ............. 360/66 |
| 6,275,454 B1 | * | 8/2001 | Boutaghou et al. ........ 369/44.19 |
| 6,324,130 B1 | | 11/2001 | Hatam-Tabrizi et al. |

(Continued)

FOREIGN PATENT DOCUMENTS

JP       03-241576       10/1991

(Continued)

*Primary Examiner*—Hoa T. Nguyen
*Assistant Examiner*—Dismery Mercedes
(74) *Attorney, Agent, or Firm*—Antonelli, Terry, Stout & Kraus, LLP.

(57) ABSTRACT

A magnetic disk apparatus including: a disk holding data as magnetic information on a magnetic recording film; a head to perform writing and reading of the magnetic information; a rotary actuator to move the head in a radial direction of the disk; plural heat elements in the head to locally heat the disk; a write element in the head to apply a magnetic field to the disk; and means for selecting at least one heat element from the plural heat elements, wherein the means for selecting the heat element selects at least one heat element from the plural heat elements so as to bring a center line of an area heated by the heat element and a center line of the position of the magnetic field generated by the write element into approximate correspondence, in correspondence with a relative angle between the head and a direction of movement of the disk.

1 Claim, 21 Drawing Sheets

U.S. PATENT DOCUMENTS

| | | | |
|---|---|---|---|
| 6,377,413 B1 * | 4/2002 | Sacks et al. | 360/48 |
| 6,507,463 B1 * | 1/2003 | Boutaghou | 360/294.3 |
| 6,532,125 B1 * | 3/2003 | Hamann et al. | 360/59 |
| 6,674,594 B1 | 1/2004 | Wakabayashi et al. | |
| 6,741,524 B2 * | 5/2004 | Ichihara et al. | 369/13.01 |
| 6,963,464 B2 * | 11/2005 | Xu et al. | 360/75 |
| 7,239,470 B2 * | 7/2007 | Takahashi et al. | 360/75 |
| 2001/0033452 A1 | 10/2001 | Koganezawa et al. | |
| 2004/0027728 A1 * | 2/2004 | Coffey et al. | 360/313 |
| 2004/0075940 A1 * | 4/2004 | Bajorek et al. | 360/110 |
| 2004/0114268 A1 * | 6/2004 | Satoh et al. | 360/75 |
| 2005/0057841 A1 * | 3/2005 | Stover et al. | 360/59 |

FOREIGN PATENT DOCUMENTS

| | | |
|---|---|---|
| JP | 04-047512 | 2/1992 |
| JP | 09-231538 | 9/1997 |
| JP | 11-096608 | 4/1999 |
| JP | 11-213419 | 8/1999 |
| JP | 11-346482 | 12/1999 |
| JP | 2001-250349 | 9/2001 |
| JP | 2001-319387 | 11/2001 |
| JP | 2002-001949 | 1/2002 |
| JP | 2002-50012 | 2/2002 |
| JP | 2002-157850 | 5/2002 |
| JP | 2002-208151 | 7/2002 |
| WO | WO 98/20487 | 5/1998 |
| WO | 01/65547 | 9/2001 |

* cited by examiner

4 HEAT ELEMENT
6 SUSPENSION
5 MECHANISM OF OFFSETTING HEAT ELEMENT
1 HEAD
3 WRITE ELEMENT
2 READ ELEMENT
DISK MOVEMENT

5 MECHANISM OF OFFSETTING HEAT ELEMENT
4 HEAT ELEMENT
1 HEAD
CENTER LINE OF HEAT AND WRITE ELEMENTS
2 READ ELEMENT
3 WRITE ELEMENT
DIRECTION OF OFFSETTING HEAT ELEMENT
DIRECTION OF DISK MOVEMENT
YAW ANGLE OF HEAD

FIG.3 CONVENTIONAL
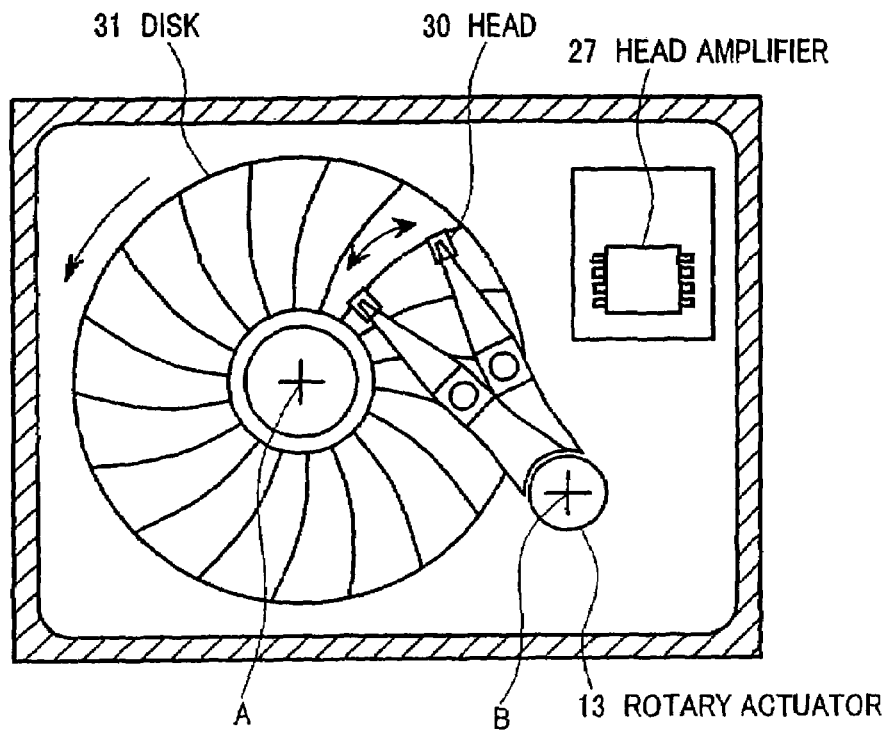
FIG.4 CONVENTIONAL
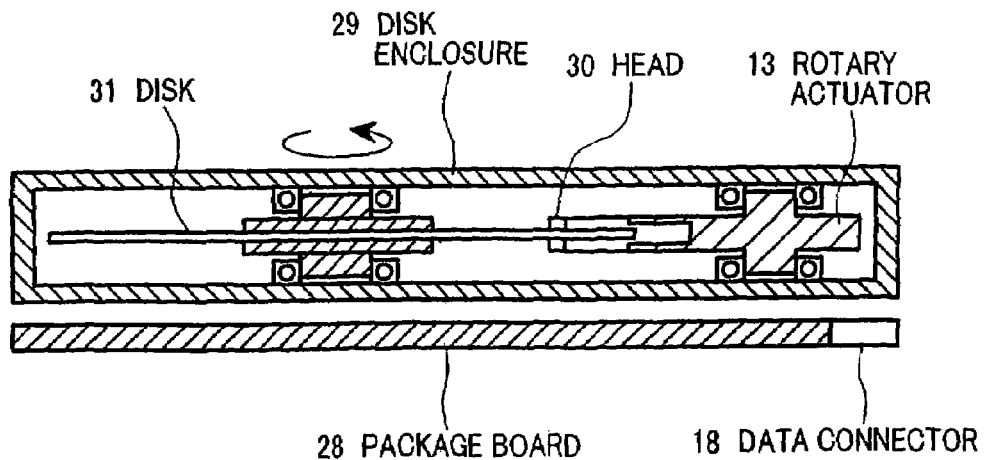

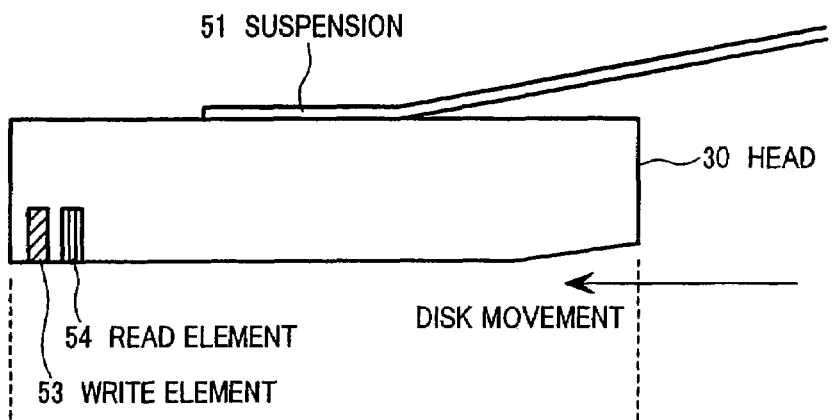
FIG.5A
CONVENTIONAL
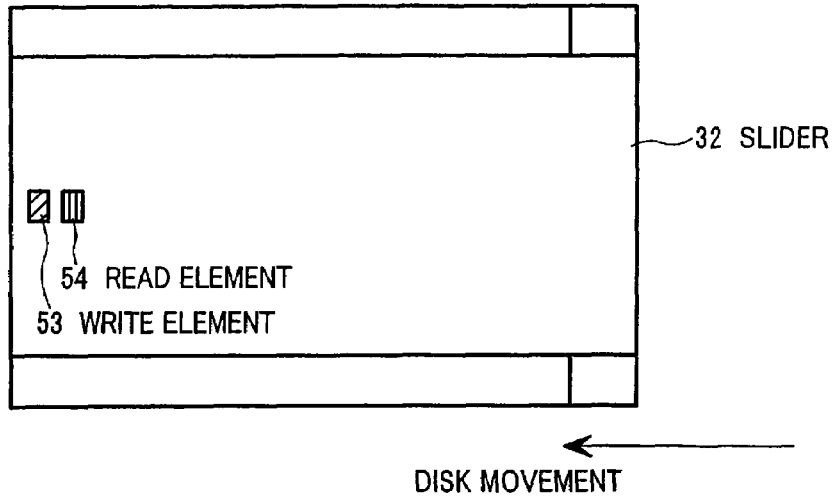
FIG.5B
CONVENTIONAL

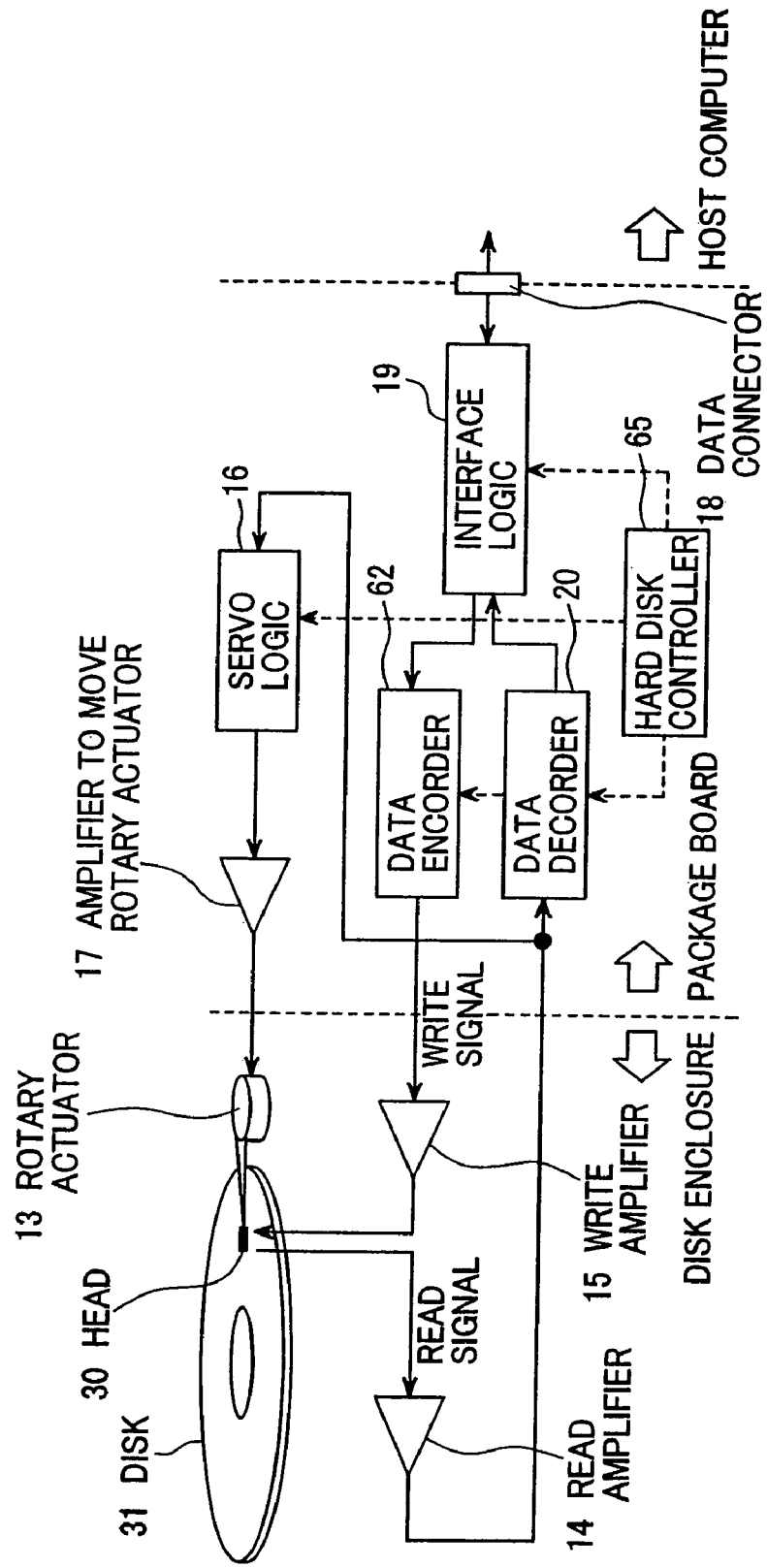
FIG.6 CONVENTIONAL

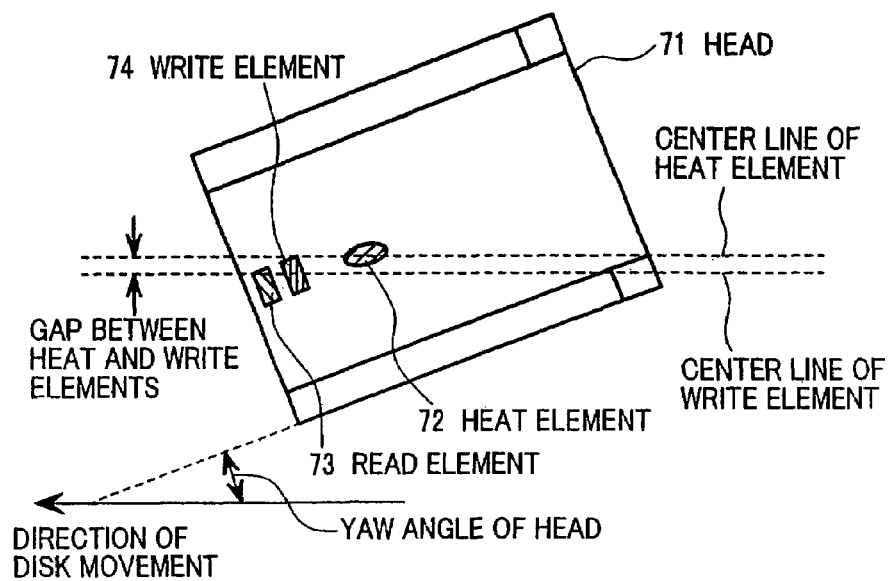
FIG.7 CONVENTIONAL

| ZONE NUMBER | TRACK NUMBER | YAW ANGLE(°) |
|---|---|---|
| 13 | 0 | -15.2 |
| 12 | 2346 | -13.7 |
| 11 | 4692 | -12.2 |
| 10 | 7038 | -10.6 |
| 9 | 9384 | -9.0 |
| 8 | 11730 | -7.3 |
| 7 | 14076 | -5.6 |
| 6 | 16422 | -3.8 |
| 5 | 18768 | -1.8 |
| 4 | 21114 | 0.2 |
| 3 | 23460 | 2.4 |
| 2 | 25806 | 4.7 |
| 1 | 28152 | 7.3 |

MAGNETIC DISK APPARATUS HAVING AN ADJUSTABLE MECHANISM TO COMPENSATE WRITE OR HEAT ELEMENT FOR OFF-TRACKING POSITION WITH YAW ANGLE

CROSS REFERENCE TO RELATED APPLICATION

This is a divisional of U.S. application Ser. No. 10/633,621, filed Aug. 5, 2003 now U.S. Pat. No. 7,027,248. This application relates to and claims priority from Japanese Patent Application Nos. 2002-232898, filed on Aug. 9, 2002 and 2003-138480, filed on May 16, 2003. The entirety of the contents and subject matter of all of the above is incorporated herein by reference.

BACKGROUND OF THE INVENTION

1. Field of the Invention

The present invention relates to a disk apparatus for recording information, and more particularly, to a thermal assisted type magnetic recording apparatus in which the coercivity of a magnetic disk is locally reduced by a heat element for recording information in a high density, magnetic recording is performed using a write element in this position, and thereafter, the information is read from the magnetic disk using a read element.

2. Description of the Related Art

FIG. 3 is a top plan view of the inside of enclosure of a magnetic disk apparatus. FIG. 4 is a cross-sectional view of the magnetic disk apparatus. As shown in FIGS. 3 and 4, the magnetic disk apparatus has, as principal constituent elements, a head 30, a disk 31, a rotary actuator 13, a head amplifier 27, a package board 28 and the like. The disk 31, fixed to one rotary shaft, is rotate-driven by a spindle motor about a point A at a speed of 3000 to 15000 revolutions per minute. The head 30, fixed to an arm, is rotate-driven by the rotary actuator 13 about a point B, and is freely movable in a radial direction of the disk 31. As the rotary actuator is appropriate for downsizing of the mechanism, this type of actuator is employed in all the recently-released magnetic disk apparatuses. Further, the head 30 floats with a constant interval from the disk 31 by utilizing the air flow of the rotating disk 31. A servo circuit, an interface circuit, a hard disk controller (HDC) and the like, as well as a data decoder and a data encoder as signal processing circuits, are packaged on the package board 28.

The construction of the head 30 will be described with reference to FIGS. 5A and 5B. FIG. 5A shows a cross section of the head 30, and FIG. 5B, a bottom surface of the head 30. The head 30, provided on a slider 32, has a write element 53 to form a magnetic pattern on the disk, a read element 54 to convert magnetic information leaked from the magnetic pattern on the disk into an electric signal, and the slider 32 to support these elements with an air bearing on the disk 30. The write element 53, having a coil and a magnetic pole, generates a write magnetic field to the disk 12 by feeding a write current through the coil. Further, the read element 54, having a magnetoresistive sensor utilizing a magnetoresistive effect, performs a reading operation by a resistance change of the sensor as a current change or voltage change. Note that the write element and the read element are given as conventional elements, and the present invention is not limited to these elements.

The operations and functions of the respective parts of the magnetic disk apparatus will be described with reference to a block diagram of FIG. 6 (with reference to FIG. 2). Upon data writing, the interface circuit 19 (same function in both FIGS. 2 and 6) receives digital data from the outside, then the data is amplified to a write current via a data encoder 62 (similar to data encoder 26 in FIG. 2) and a write amplifier 15 (same function in both FIGS. 2 and 6) as signal processing circuits, and the write current is inputted into the write element 53 of the head 30 and converted into a write magnetic field.

Upon data reading, the read element 54 of the head 30 converts a leak magnetic field generated from the disk 31 into an electric signal. The electric signal is amplified by a read amplifier 14 (same function in both FIGS. 2 and 6), inputted into a data decoder 20 (same function in both FIGS. 2 and 6) as a signal processing circuit and demodulated to the initial digital data. The digital data is sent by the interface circuit 19 to an external host machine. The head 30 can freely move in the disk radial direction by the rotary actuator 13 (same function in both FIGS. 2 and 6). To write and read a particular data track, a following operation must be accurately performed in a target radial position. The servo circuit 16, which controls the following operation, measures accurate relative positions of the head 30 and the disk 31 from servo information previously written on the disk 31, and controls the operation of the rotary actuator 13 via an amplifier 17 to move the rotary actuator. The hard disk controller (HDC) 65 generally controls these processings.

To increase the storage capacity of the magnetic disk apparatus, it is necessary to write a small magnetic pattern onto the magnetic disk. For stable existence of small magnetic pattern, the disk must have a high coercivity. To invert the direction of magnetization of a high-coercivity disk, the write element of the head must generate a high magnetic field. However, in a case where a write element with a narrow track width for the purpose of writing small magnetic pattern, the generated magnetic field is weaken. Thus, the limit of storage capacity is a problem.

To solve this problem, a thermal recording system has been proposed. This system utilizes the principle of a widely used magneto-optic disk. A magnetic field is applied to a comparatively wide area and a narrow area of the disk is heated, thereby a magnetic mark is formed in the heat area. For example, Japanese Published Unexamined Patent Application No. Hei 4-47512 (patent reference 1) discloses a technique of increasing a disk temperature using laser light and forming a mark within a laser-light irradiation range, and a technique of forming an arc read element on a slider for high-efficiency reading of a formed circular-arc mark. Further, Japanese Published Unexamined Patent Application No. Hei 11-96608 (patent reference 2) discloses a technique of forming a mark, using a heat element with a resistor, within a resistor heating range, and a technique of forming a slider holding the resistor. Further, PCT/WO01/65547 (patent reference 3) discloses a technique of forming a circular-arc mark by increasing a disk temperature using laser light and performing following by offsetting a track position in correspondence with a change of yaw angle of a slider for the purpose of high-efficiency reading of the circular-arc mark.

However, in these techniques, as the write mark is determined based on the size of heat area, a comparatively large spot diameter of the laser light and the size of heat element set an upper limit of recording density. Further, as a comparatively large write element is employed, coil switching time sets an upper limit of recording speed.

[Patent Reference 1]
Japanese Published Unexamined Patent Application No. Hei 4-47512

[Patent Reference 2]
Patent Japanese Published Unexamined Patent Application No. Hei 11-96608

[Patent Reference 3]
PCT/WO01/65547

To solve these problems, a thermal assisted type magnetic recording system has been proposed. In this system, the temperature of an area of the disk is increased by a heat element, so as to reduce the coercivity of this area, and a magnetic pattern is formed using a write element in this coercivity-lowered area. This series of operations reduces a necessary magnetic field generated by the write element. Further, as the disk temperature changes back into a room temperature after the writing operation, even a small magnetic pattern can be protected from a thermal decay effect, and a write pattern can stably exist for long hours. The difference of the thermal assisted type system from the conventional thermal recording system is that in the thermal assisted type system, a magnetic pattern is formed in an area of magnetic field generated by the write element, whereas in the thermal recording system, a magnetic pattern is formed in an area heated by the heat element. In the thermal assisted type system, since it is possible to combine a disk with a high coercivity and a small write element, the storage capacity of the magnetic disk apparatus can be greatly increased.

However, the thermal assisted type recording system has a problem of change of yaw angle of the head accompanying the moving operation of the head along an arc in the disk radial direction using the rotary actuator. FIG. 7 shows an example where a center line of a heat element 72 and that of a write element 74 are shifted from each other upon occurrence of yaw angle in a head 71. Unless writing is performed by the write element within 10 microseconds after heating an area of the disk by the heat element 72, the heat area is spread and the temperature is lowered. Accordingly, this period should be preferably short. Further, writing cannot be performed after 4 to 20 milliseconds of 1 rotation of the disk. Accordingly, the heat element 72 and the write element 74 must be arranged on a straight line in a writing target track. In this example, as the yaw angle exists, the heat element 72 heats a track different from that where writing is made by the write element 74, accordingly, a magnetic pattern cannot be accurately formed on the disk. Note that as the reading operation is performed separately from the writing operation, a read element 73 regarding the reading operation does not set a limitation of a relative position to the heat element 72 and the write element 74. Further, in the above-described conventional thermal recording system, as a writing magnetic field is applied to a comparatively wide range, there is no problem regarding strict relative relations of the heat element 72 and the write element 74.

To solve the above problem, an apparatus structure with a constant yaw angle using a linear actuator must be adopted, otherwise, the area heated by the heat element and the area for the magnetic field generated by the write element must be brought into correspondence. However, as the liner actuator has a low rigidity, the accuracy of head positioning is lowered, and further, the linear actuator is a large and high-cost device. On the other hand, several techniques of bringing a heat area and magnetic-filed applied area close to each other are disclosed. For example, Japanese Published Unexamined Patent Application No. 2001-319387 discloses a technique of heating a position immediately below the write element by emitting laser light as heat means in a slanting direction by the side of the write element. In this technique, the problem of yaw angle can be mitigated, however, in a case where the interval between the head and the disk is reduced for writing a smaller magnetic pattern onto the magnetic disk, the effect of slanted emission of laser light is reduced and a position immediately below the write element cannot be heated. Further, Japanese Published Unexamined Patent Application No. 2002-50012 discloses a technique of embedding a waveguide in a position very close to the write element and heating a position around the write element by passing laser light through the waveguide. Also in this technique, the problem of yaw angle can be mitigated, however, in a case where the size of the write element is reduced for writing a smaller magnetic pattern onto the magnetic disk, formation of the waveguide is extremely difficult.

SUMMARY OF THE INVENTION

To solve these problems, a new technique is desired for a small and light weight magnetic disk apparatus using a rotary actuator which has a large storage capacity using a thermal assisted type recording system.

The present invention has been made in consideration of the above situation, and provides a magnetic disk apparatus having an offsetting mechanism to relatively move a write element and a heat area heated by a heat element in a width direction of a slider of a magnetic head which moves along a circular arc on a disk. Further, in the magnetic disk apparatus, plural write elements and plural heat elements are provided and one write element and one heat element are appropriately selected, to relatively move the write element and the heat area heated by the heat element in the width direction of the magnetic head.

BRIEF DESCRIPTION OF THE DRAWINGS

FIG. 3 is a top plan view showing the inside of the enclose of the conventional magnetic disk apparatus;

FIG. 4 is a cross-sectional view showing the structure of the conventional magnetic disk apparatus;

FIG. 5A is a cross-sectional view showing the structure of the conventional magnetic head;

FIG. 5B is a plan view showing the bottom surface of the conventional magnetic head;

FIG. 6 is a block diagram showing the functional construction of the conventional magnetic disk apparatus;

FIG. 7 is a cross-sectional view showing the change of positional relation between the respective elements due to the yaw angle of the conventional magnetic head;

DESCRIPTION OF THE PREFERRED EMBODIMENTS

Figure 1A:
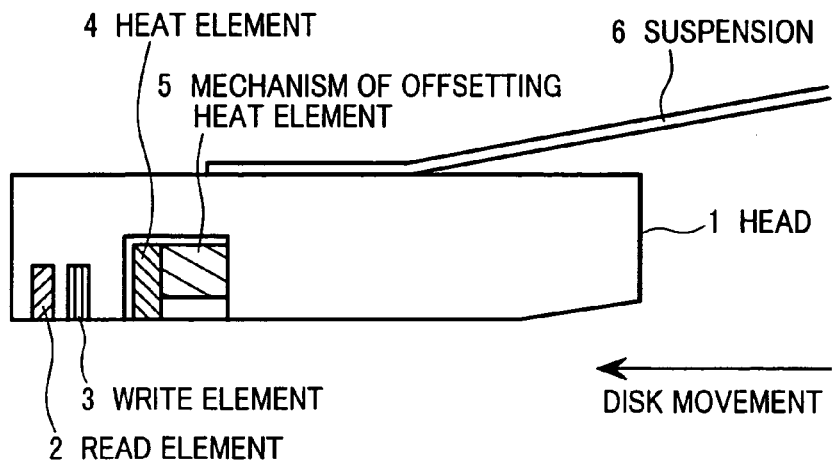
FIG. 1A is a cross-sectional view showing the structure of a magnetic head of a magnetic disk apparatus according to an embodiment of the present invention.
Figure 1B:
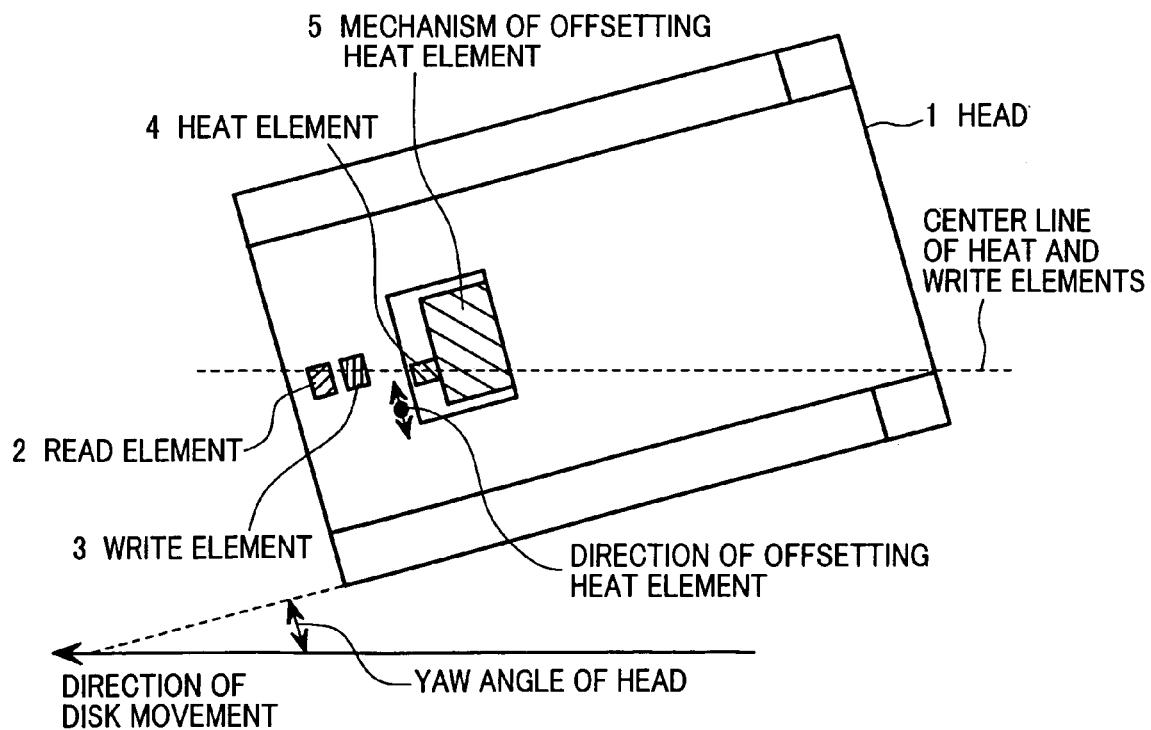
FIG. 1B is a plan view of the magnetic head viewed from the disk side.

FIGS. 1A and 1B show the structure of a magnetic head according to an embodiment of the present invention. FIG. 1A shows a cross section of a head 1. The head 1, supported by a suspension 6, is floated on a rotating disk 12 with a constant interval from the disk. The disk 12 runs in a right-to-left direction in the figure. The head 1 has a read element 2 to detect magnetic information recorded on the disk, a write element 3 to generate a magnetic field to write the magnetic information on the disk, a heat element 4 to locally heat the disk for assisting recording of the magnetic information onto the disk, and a mechanism of offsetting heat element 5, to offset the heat element 4 in a slider width direction (or track width direction if a width direction of a magnetic width section recorded by the write element 3 is called a track width direction). Note that the offset direction does not necessarily correspond with the slider width direction, but there may be slight shift in accordance with the size of heat area. Semiconductor laser, a heat generating resistor or the like may be used as the heat element 4, however, the present invention is not limited to these heating means. The same elements in the conventional magnetic disk apparatus may be used as the read element 2 and the write element 3. However, in the conventional magnetic disk apparatus, the read element 2 is often positioned in front of the write element 3 in the direction of disk movement. In the present embodiment, to shorten the distance between the heat element 4 and the write element 3 as much as possible, the write element 3 is positioned in front of the read element 2, however, the present invention is not limited to this order of the elements.

FIG. 1B shows the head 1 viewed from the disk 12 side. In this figure, when the head 1 is moved by a rotary actuator in the radial direction of the disk 12, the head 1 is moved along a circular arc thereby the head 1 is slanted to the direction of movement of the disk 12. In the conventional art, the problem is that the center line of the heat element 4 and that of the write element 3 are shifted from each other. However, as the heat element offsetting mechanism 5 of the present invention can offset the heat element 4 in a slider width direction indicated with an arrow in the figure, even if a heat element to heat a very narrow area is employed, the center line of the heat element can be accurately brought into correspondence with that of the write element 3. As the coercivity of the disk 12 is temporarily reduced by heating the disk 12, a short bit-length magnetic pattern can be easily formed. Further, as the width of heat area is approximately the same as that of the write element 3, the spread of recording area in an off-track direction can be reduced, and a magnetic pattern for a narrow track can be easily formed. With these advantages, the storage capacity of the thermal assisted type magnetic disk apparatus can be greatly increased.

In this example, the apparatus has the heat element offsetting mechanism to adjust the position of the heat element in the off-track direction, however, similar advantages can be attained by a technique of adjusting the position of the write element in the off-track direction. That is, the advantages can be attained by providing a mechanism to change the relative positional relation between the heat element and the write element in the slider width direction. By this arrangement, the heat element and the write element can move on the same track regardless of the existence of yaw angle.

Figure 8A:
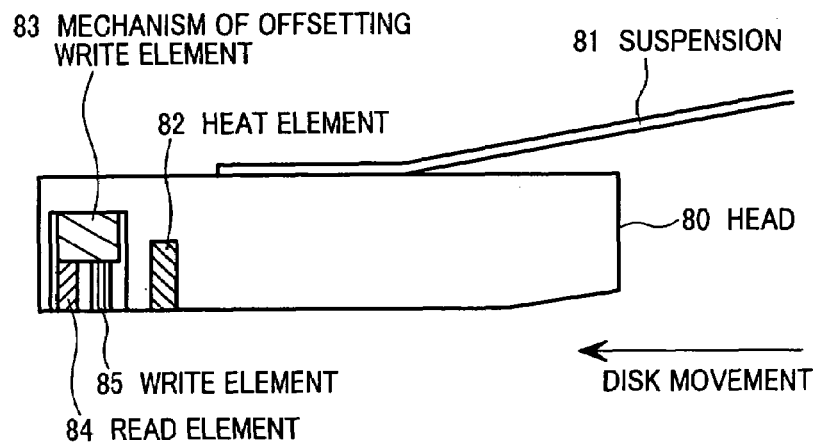
FIG. 8A is a cross-sectional view showing the structure of the magnetic head of a magnetic disk apparatus according to another embodiment of the present invention.
Figure 8B:
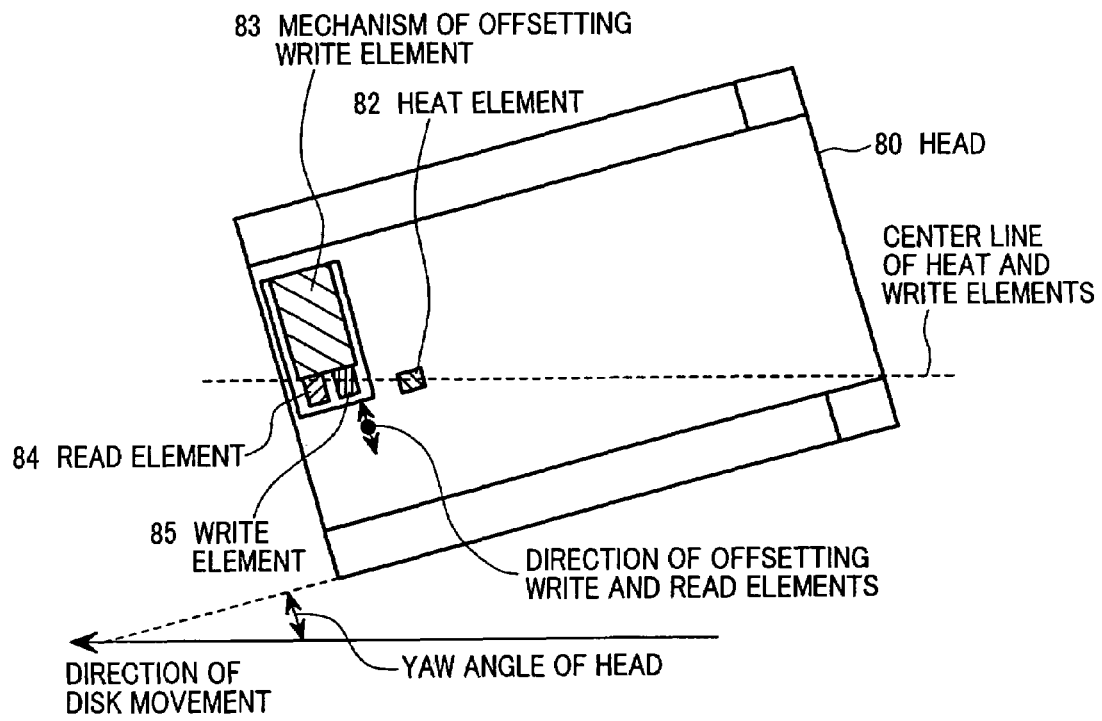
FIG. 8B is a plan view of the magnetic head viewed from the disk side.

FIGS. 8A and 8B show the structure of the magnetic head according to another embodiment of the present invention. FIG. 8A shows a cross-section of a head 80 viewed from a side position, and FIG. 8B, the head 80 viewed from the disk 12 side (disk 12 not shown in FIGS. 8A, 8B, see, e.g., FIG. 2). Even when the head 80 is slanted to the direction of movement of the disk 12, a write element offsetting mechanism according to the second embodiment can offset a write element 85 in the slider width direction indicated with an arrow in the figure, accordingly, the center line of a heat element 82 and that of the write element 85 can be accurately brought into correspondence. In this embodiment, the storage capacity of the thermal assisted type magnetic disk apparatus can be greatly increased by similar advantages to those of the first embodiment. Note that in the present embodiment, a read element 84 is also integrally offset with the write element 85, however, the present invention is not limited to this arrangement but it may be arranged such that only the write element 85 is offset.

Figure 2:
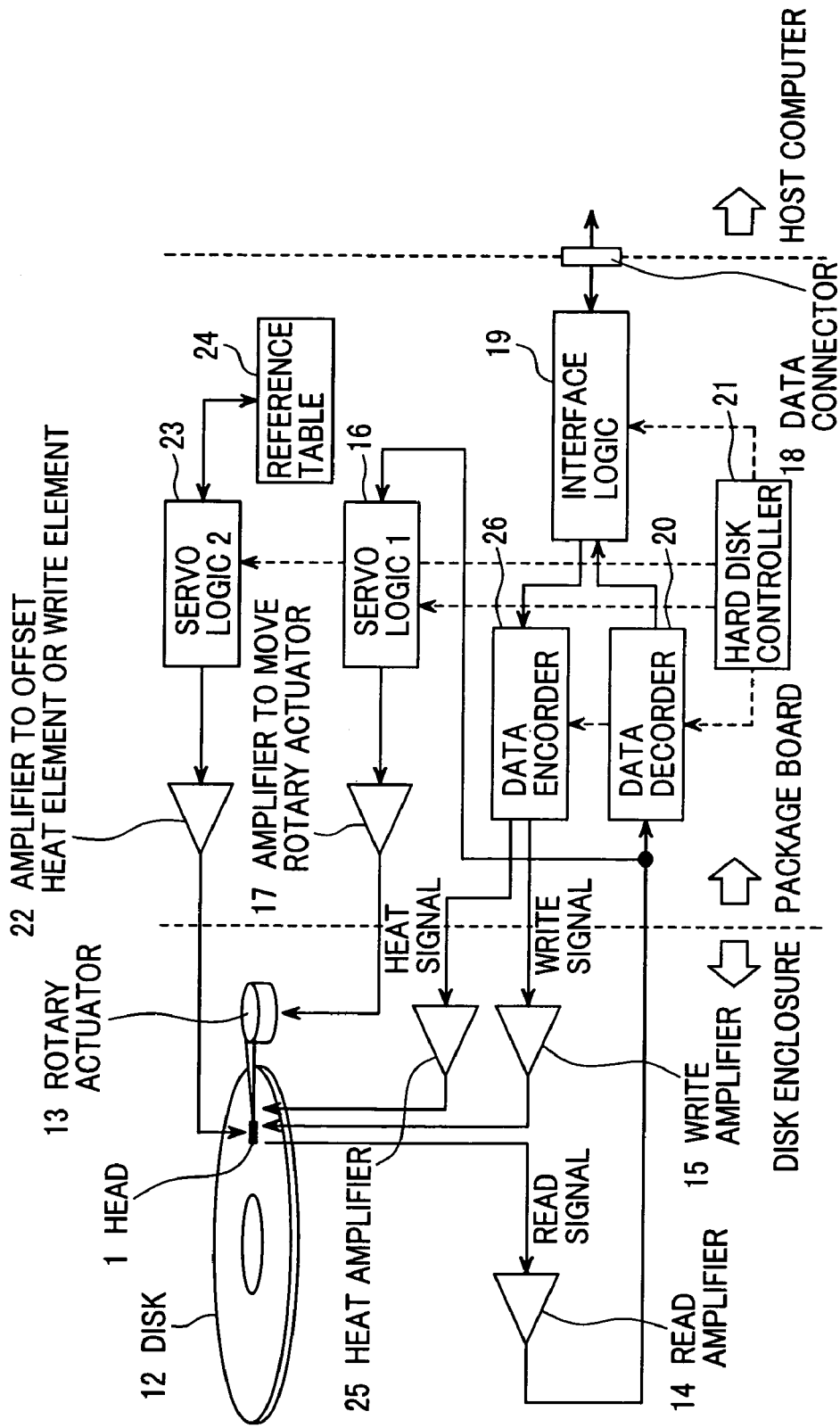
FIG. 2 is a block diagram showing the functional construction of the magnetic disk apparatus according to the present invention.

FIG. 2 is a block diagram showing the functional construction of the magnetic disk apparatus according to the present invention. The apparatus has a second servo circuit 23 to control the heat element offsetting mechanism 5 (too small to be shown in FIG. 2, see, e.g., FIGS. 1A, 1B) or the write element offsetting mechanism 83 (too small to be shown in FIG. 2, see, e.g., FIGS. 8A, 8B) and amplifiers 25 and 22, and a reference table 24, in addition to the conventional first servo circuit 16 and the amplifier 17 to control a rotary actuator. The second servo circuit 23 reads a value from a reference table 24 in correspondence with a numerical value of a target track (related to a yaw angle) received from the HDC 21 and an environmental temperature, and calculates an output value. The output value from the second servo circuit 23 is inputted into the offsetting mechanism 5 or mechanism 83 on the head 1 via an amplifier to offset the heat element or the write element 22, and the arrangement of the heat element 4 and the write element 3 on a straight line in the direction of disk movement is kept at an arbitrary yaw angle. (Since elements 4 and 3 are carried on the head 1, they are too small to be shown in FIG. 2, see, e.g., FIGS. 1A, 1B.) At this time, the HDC 21 also controls the heat element 4 using the heat amplifier 25. Note that in this control, as the operation of the offsetting mechanism 5 or 83 is completed in correspondence with a seek speed of the second servo circuit 23, the response is comparatively slow. Accordingly, the control can be performed, in combination with an adjusting process to be described later, in an open loop.

Figure 9:
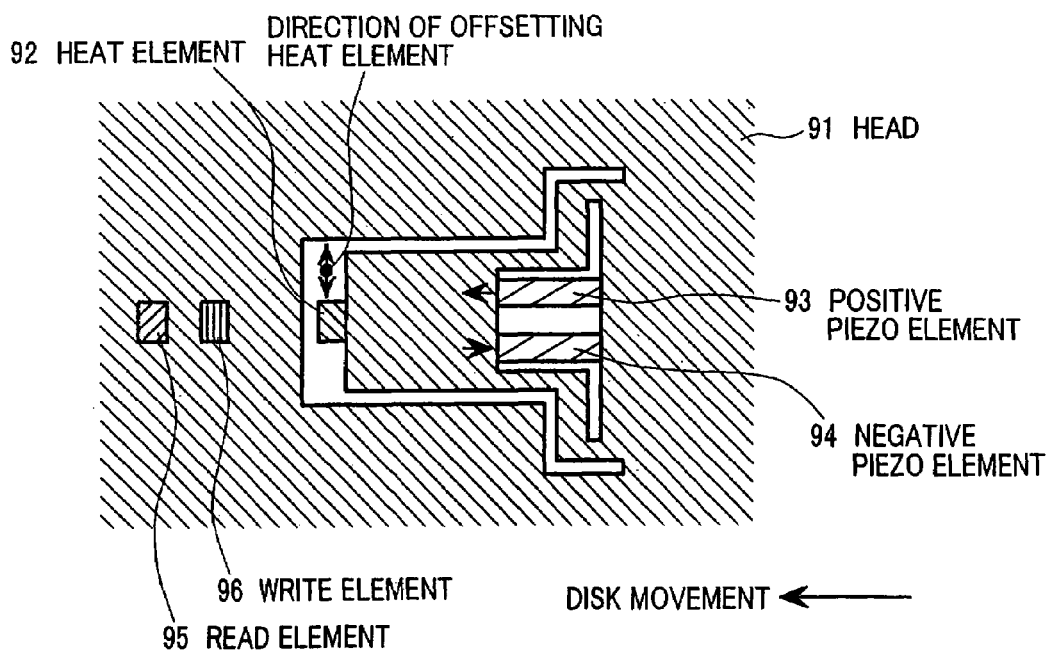
FIG. 9 is a partially expanded cross-sectional view showing the structure of the magnetic head according to another embodiment of the present invention.

FIG. 9 shows an example where the heat element offsetting mechanism 5 is realized with piezo elements. FIG. 9 is a cross-section of a surface of a head 91 opposite to the disk 12 (not shown in FIG. 9, see, e.g., FIG. 2), in which an arrow indicates a right-to-leftward direction of movement of the disk 12. A pair of piezo elements 93 and 94 are arrayed in parallel to each other. The piezo elements 93 and 94 generate mutually opposite lateral forces based on a voltage output from the amplifier 22 (not shown in FIG. 9, see, e.g., FIG. 2) to offset the heat element or the write element. A head 91 is provided with a hinge function comprised of an elastic body to increase its moving direction by converting the forces into up-to-down directional forces. By this arrangement, the heat element 92 moves in the slider width direction. In the present embodiment, a downsized, light weighted and highly-rigid offsetting mechanism can be realized. Further, a positional shift hardly occurs upon reception of impactive force from the outside, and high reliability to malfunctions can be attained. Further, as the amount of electric consumption of the piezo element is small and the amount of heat generation thereof is small, the influence of drift due to self heat generation is small. Further, as the linearity between an input value into the piezo element and the offset position is high, the heat element can be accurately moved to a target offset position. Thus the storage capacity of the thermal assisted type magnetic disk apparatus can be greatly increased. In the present embodiment, the pair of two piezo elements are employed, however, the present invention is not limited to this arrangement. In a case where one of these piezo element is used, similar advantages can be obtained though the linearity is slightly degraded. Further, in the present embodiment, the heat element 92 is offset, however, the present invention is not limited to this arrangement, but similar advantages can be obtained in a case where the write element 96 is offset.

Figure 10A:
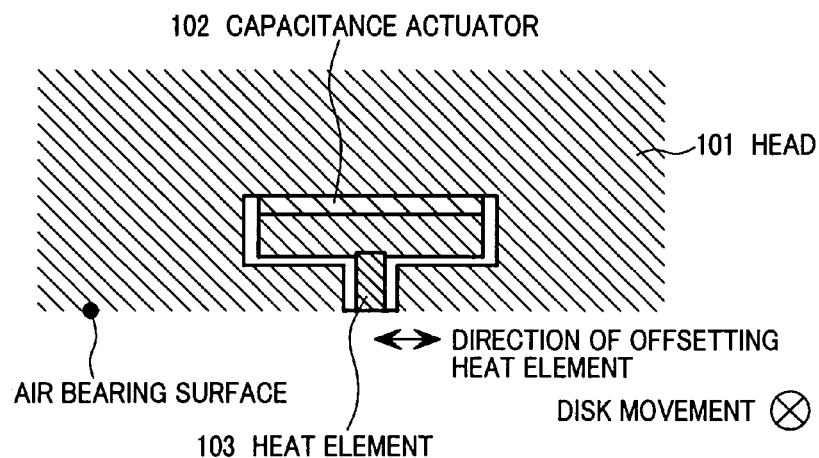
FIG. 10A is a partially expanded cross-sectional view showing the structure of the magnetic head according to another embodiment of the present invention.
Figure 10B:
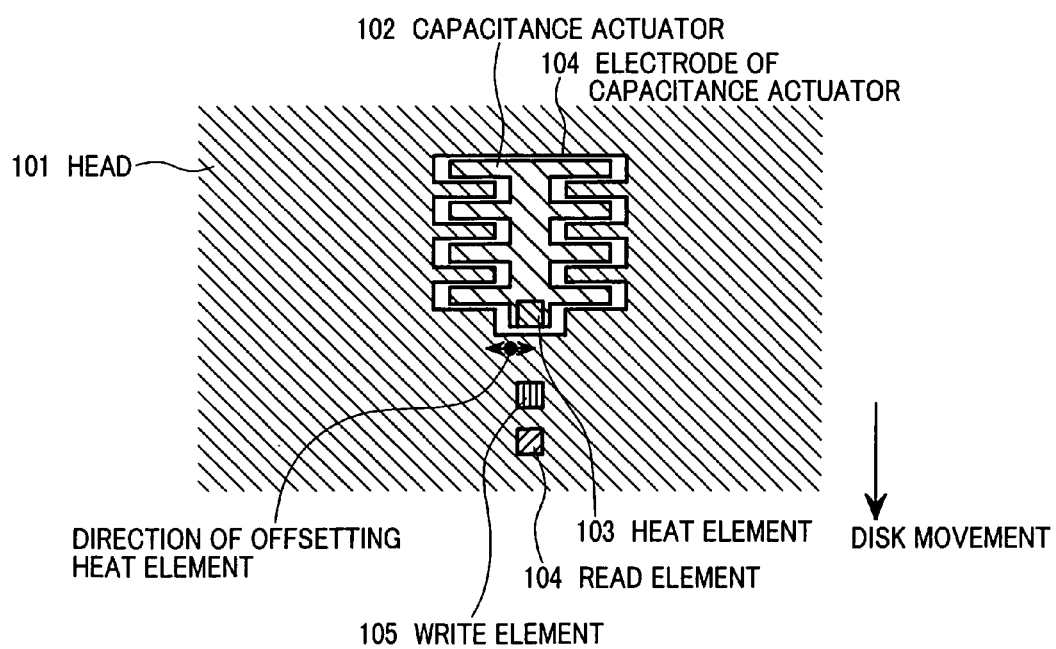
FIG. 10B is a partially expanded cross-sectional view showing the structure of the magnetic head according to the other embodiment of the present invention.

FIGS. 10A and 10B show an example where the heat element offsetting mechanism 5 is realized with a capacitance actuator 102, to offset heat element 103. FIG. 10A is a partially expanded cross-sectional view of a head 101 viewed from a side position, in which the direction of movement of the disk 12 is backward direction vertical to the surface of the drawing sheet. FIG. 10B is a partially expanded cross-sectional view of a surface of the head 101 opposite to the disk 12, in which an arrow indicates a up-to-downward direction of movement of the disk 12. The capacitance actuator 102 is provided in parallel to the disk 12. A voltage output from an amplifier to offset heat element or write element is applied to a capacitance electrode 104, thereby left-to-right directional forces are generated so as to freely offset a heat element 103. As the capacitance actuator can be formed by a wafer process, a downsized and light weighted offsetting mechanism, particularly having good compatibility with a process of planer type head, can be realized. Further, as the amount of electric consumption of the capacitance actuator is small and the amount of heat generation there of is small, the influence of drift due to self heat generation is small, and positioning between a heat element 103 and a write element 105 can be accurately made. Thus the storage capacity of the thermal assisted type magnetic disk apparatus can be greatly increased. In the present embodiment, the heat element 103 is offset, however, the present invention is not limited to this arrangement. In a case where the write element 105 is offset, similar advantages can be obtained.

Figure 11:
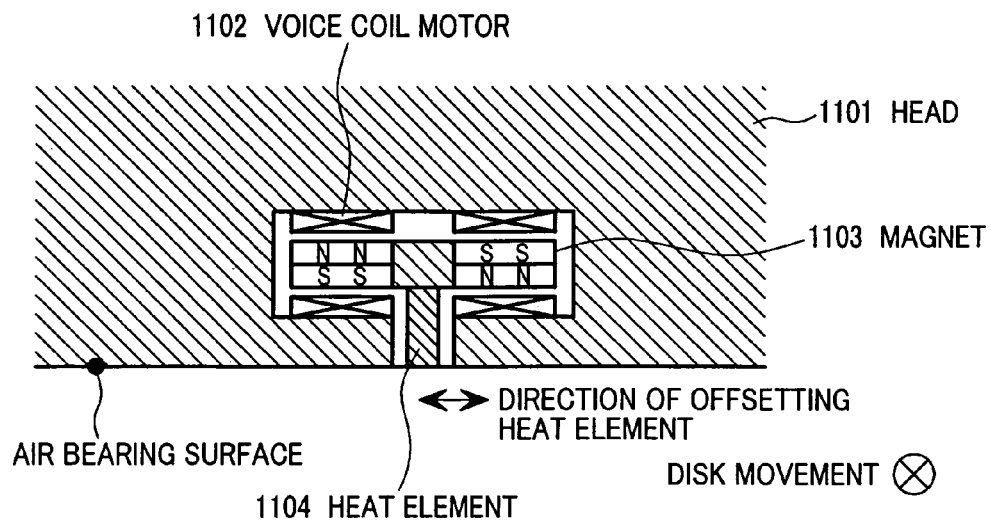
FIG. 11 is a partially expanded cross-sectional view showing the structure of the magnetic head according to another embodiment of the present invention.

FIG. 11 shows an example where the heat element offsetting mechanism 5 of the present invention is realized with a voice coil motor. FIG. 11 is a partially expanded cross-sectional view of a head 1101 viewed from a side position, in which the direction of movement of the disk 12 is backward direction vertical to the surface of the drawing sheet. Magnets 1103 are arranged in parallel to the disk 12. An electric current output from the amplifier 22 to offset heat element or write element is applied to a voice coil motor 1102, thereby the magnets generate left-to-right directional forces so as to freely offset the heat element within a wide range. As the voice coil motor 1102 and the magnets 1103 can be formed in a similar process to the wafer process of the write element, a downsized and light weighted offsetting mechanism, particularly having good compatibility with a process of planer type head, can be realized. Further, as the voice coil motor input an electric current, a wide movable range can be obtained even at a low voltage, and designing related to arrangement of the elements can be easily made. For example, the distance between a heat element 1104 and a write element can be increased. As the voice coil motor can be used in combination with various heating means, the storage capacity of the thermal assisted type magnetic disk apparatus can be greatly increased. In the present invention, the heat element 1104 is offset, however, the present invention is not limited to this arrangement. In a case where the write element is offset, similar advantages can be obtained.

Next, an example where the heat element offsetting mechanism of the present invention is realized with a heat generating body and a heat deformation element will be described. Although not shown, a heat deformation element having a portion which is approximately linearly deformed due to heat is used. In this arrangement, the response speed of the offsetting mechanism is greatly reduced in comparison with the above-described embodiments, however, the mechanism has particularly good compatibility with the wafer process since the structure is very simple. Thus the technique of the present invention can be realized at a low cost. In a case where the movable range of the offsetting mechanism is narrowed by reducing the distance between the heat element and the write element, the response speed can be improved to a value sufficiently available in a mobile type magnetic disk apparatus. In the present embodiment, the offsetting mechanism can be more easily realized, and the storage capacity of the thermal assisted type magnetic disk apparatus can be greatly increased. In the present invention, the heat element is offset, however, the present invention is not limited to this arrangement. In a case where the write element is offset, similar advantages can be obtained.

Figure 12:
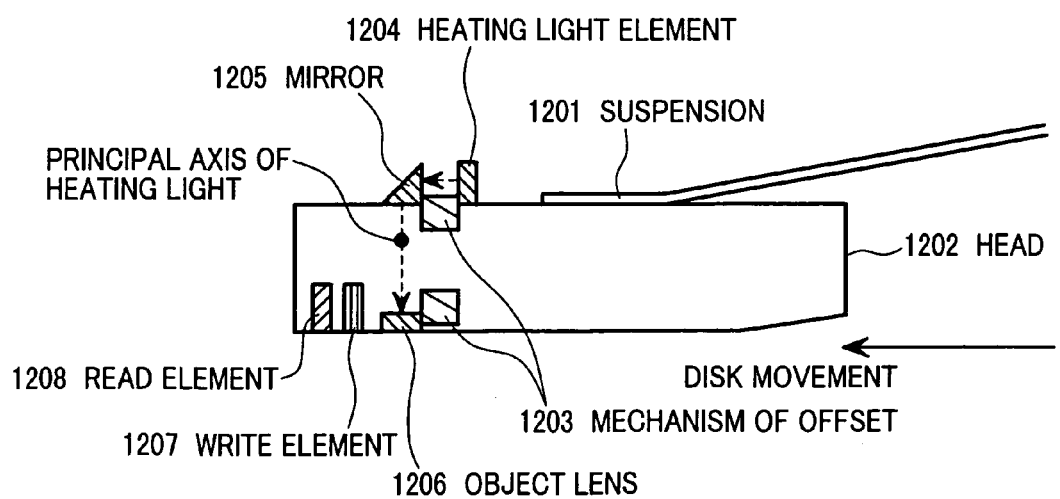
FIG. 12 is a cross-sectional view showing the structure of the magnetic head according to another embodiment of the present invention.

FIG. 12 shows an example where the heat element offsetting mechanism 5 of the present invention is realized with a light source, a mirror and an object lens. FIG. 12 is a cross-sectional view of a head 1202 viewed from a side position, in which an arrow indicates a right-to-leftward direction of movement of the disk 12. The offset direction is a backward direction vertical to the surface of the drawing sheet. An object lens 1206 is provided on a surface opposite to the disk 12, and a heating light element 1204 and a mirror 1205 are mounted on a rear surface opposite to the above surface opposite to the disk 12. The heating light element 1204 and the mirror 1205 are attached to a mechanism of offset 1203, and the positions of the heating light element 1204 and the mirror 1205 can be offset in a track width direction while approximately parallel positional relation is maintained. In this arrangement, a light axis reflected by the mirror 1205 and incident on the object lens 1206 is moved in approximately parallel. The light axis can be prevented from slanting, and a very small area on the disk can be heated. Further, as the heating light element 1204 is positioned away from a read element 1208 and a write element 1207, degradation of performance of the read element and the write element, due to heat generation by the heating light source, can be prevented. In the present embodiment, the storage capacity of the thermal assisted type magnetic disk apparatus can be greatly increased, and a magnetic disk with a high reliability can be provided. Further, the object lens can also be provided with the offsetting mechanism so as to heat a smaller area on the disk. In this arrangement, as the light axis reflected by the mirror 1205 and incident on the magnetic disk is moved in approximately parallel, a focusing shift due to slanted light axis or slanted light incidence can be prevented. A solid immersion lens can be applied to the object lens, and a further smaller area on the disk can be heated. In the present embodiment, the storage capacity of the thermal assisted type magnetic disk apparatus can be further greatly increased.

A modification of the above embodiment is as follows. The heating light element is not connected to the offsetting mechanism and is fixed in front of the mirror in the slider width direction in FIG. 12. On the other hand, the mirror is rotated 90° from the position in FIG. 12 and moved in the slider width direction by the offsetting mechanism. The lens is attached to the offsetting mechanism in a position below the mirror as in the case of the above embodiment. In this arrangement, the offsetting mechanism moves only the mirror and lens but does not move the heating light element. Since the mass of elements to be moved by the offsetting mechanism is reduced, the response is improved.

Figure 13:
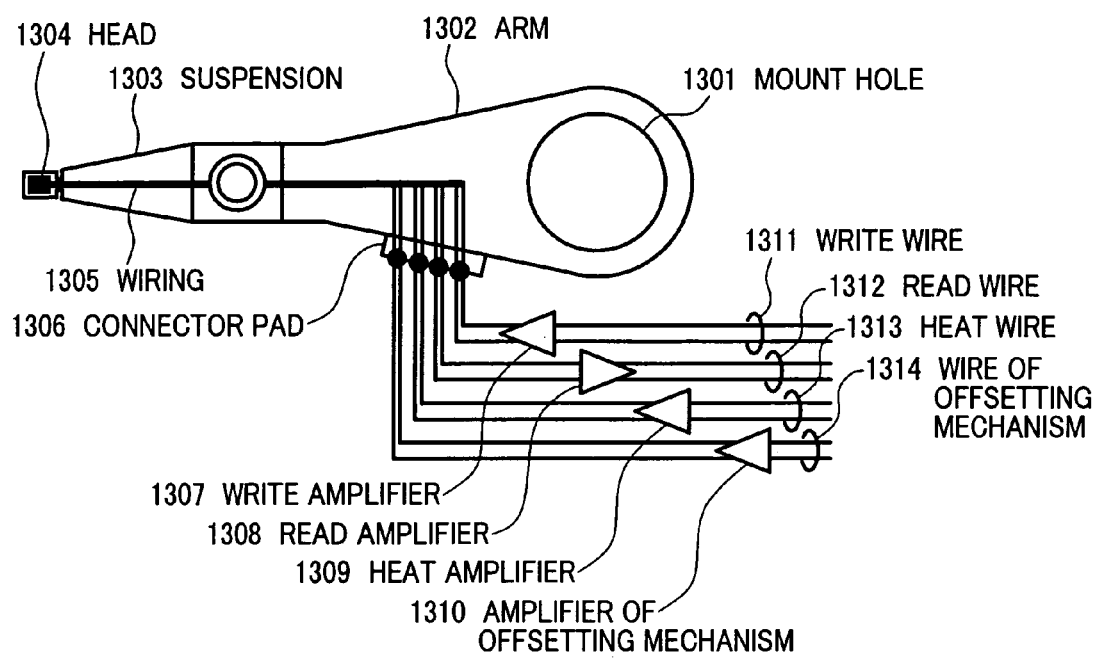
FIG. 13 is an explanatory view showing connection between the magnetic head and a servo circuit according to another embodiment of the present invention.

Next, a method for electrically connecting the respective elements and the offsetting mechanism mounted on the head of the present invention will be described with reference to FIG. 13. Terminal electrodes for the write element, the read element, the heat element and the offsetting mechanism are provided on a side surface of a head 1304 mounted on arm 1302 utilizing mount hole 1301. Note that the terminal electrode for the heat element and the offsetting mechanism may be provided on a head rear surface opposite to the surface opposite to the disk in accordance with arrangement of the heat means and the offsetting mechanism. The terminal electrodes are respectively bonded on a wiring 1305 on a suspension 1303. The electrodes, laminated with insulating material, and are extended from an arm 1302 to connector pads 1306. The connector pad wired from the heat element is supplied with heating energy connected to an output from a heat amplifier 1309. Further, the connector pad wired from the offsetting mechanism is supplied with energy to drive the offsetting mechanism connected to an output from an amplifier of offsetting mechanism 1310. The read element is connected to an input of a read amplifier 1308, and the write element is connected to an output of a write amplifier 1307, and the read element and the write element perform reading operation and writing operation. As described above, on the suspension of the head of the present invention, only 4 pairs of electric wirings (1311, 1312, 1313 and 1314) are formed, and in comparison with the techniques of transmitting energy using an optical fiber and a comparatively large mirror, a head appropriate for a downsized, light weighted and high-speed transfer magnetic disk apparatus can be provided. Further, as the offsetting mechanism can be electrically controlled, the positioning between the heat element and the write element can be accurately made, and the storage capacity of the thermal assisted type magnetic disk apparatus can be greatly increased. Note that the above-described offsetting mechanism using a pair of piezo elements and the capacitance actuator may use 3 or 4 electrodes for improvement in linear accuracy. In this case, the total number of electric wirings is 9 or 10.

Figures 14A, 14B:
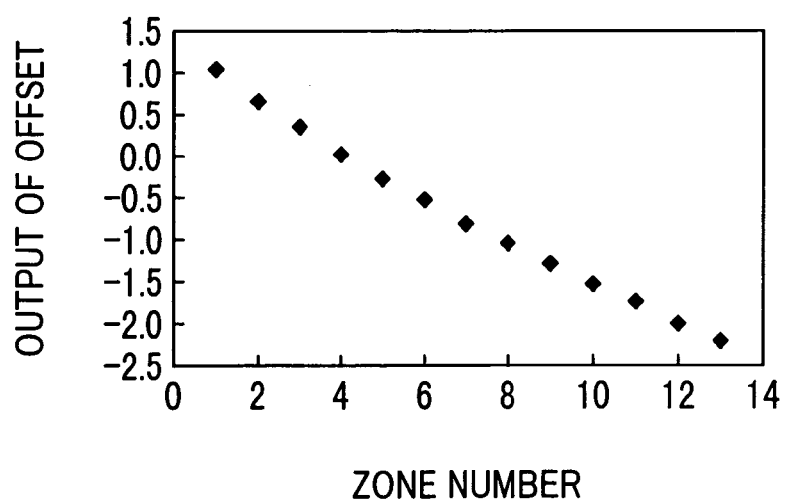
FIG. 14A is a table for explaining a method for determination of an output value by the servo circuit using a conversion table according to the present invention.
FIG. 14B is a graph explaining the method for the determination of the output value by the servo circuit using the conversion table according to the present invention.
Figure 14C:
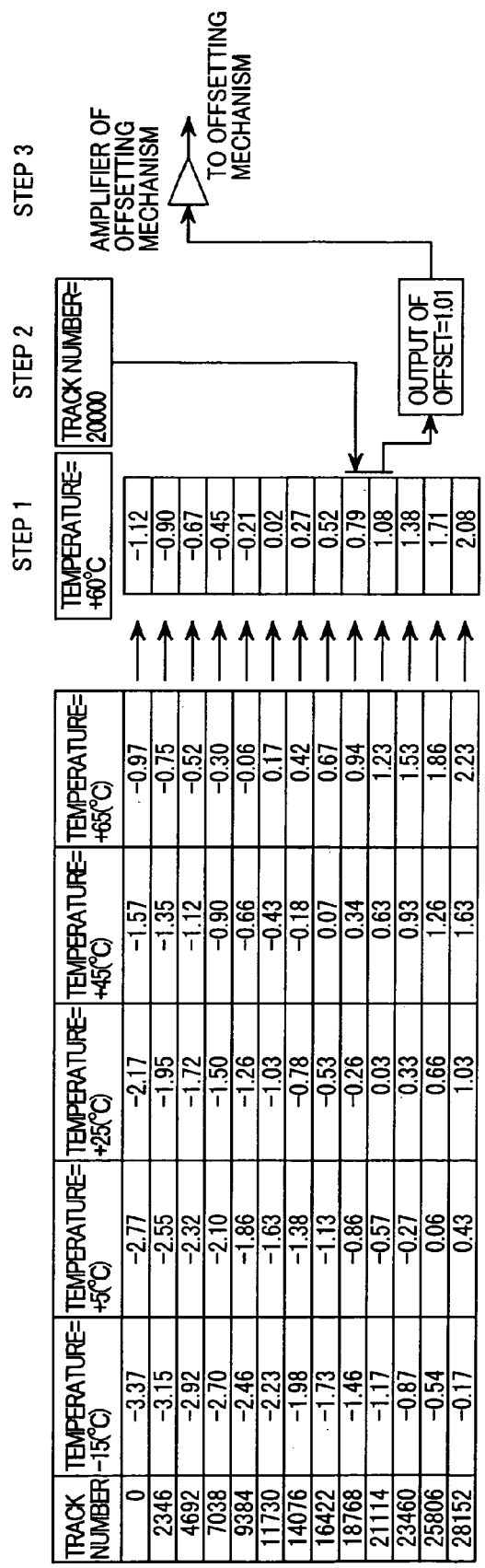
FIG. 14C is a table explaining the method for the determination of the output value by the servo circuit using the conversion table according to the present invention.

The process of calculation of output value in the second servo circuit of the present invention will be described with reference to FIG. 14. FIG. 14A is a table showing correspondence among zone numbers, track numbers and yaw angles in the disk 12. As shown in FIG. 14B, the relation between the zone number and the yaw angle is approximately linear within the range of adjacent zones. Accordingly, reference data is previously stored for respective zones such that an output value corresponding to an arbitrary track number can be accurately determined by a minimum calculation amount by performing linear approximation within the range of the zone. FIG. 14C shows an example of a reference table showing output values previously measured for zones at predetermined temperature intervals. Then, a description will be made about a method of receiving a casing inner temperature +60° C. and a condition of a track number 20000 from the HDC, and determining an output value by the second servo circuit using the reference table. First, at Step 1, data corresponding to the casing inner temperature +60° C. is calculated. For example, a +45° C. temperature "−1.54" and a +65° C. temperature "−0.97", corresponding to a track number 0, are linearly approximated and a temperature "−1.12" corresponding to the temperature +60° C. is obtained. Similarly, regarding a track number 2346, a temperature "−0.90", and regarding a track number 4692, a temperature "−0.67", are calculated. In this manner, 1 column of table corresponding to the temperature +60° C. is generated. Next, at Step 2, "+0.79" for a track number 18768 and "+1.08" for a track number 21114 in the table generated at Step 1 are linearly approximated, and an output value "+1.01" corresponding to the track number 20000 is determined. At Step 3, the output value "+1.01" is outputted to the amplifier of offsetting mechanism, so as to operate the offsetting mechanism mounted on the head. Next, the servo circuit performs a seek operation. When a target track number is changed, the circuit performs the calculation from Step 2, and only when the casing inner temperature has changed, performs the calculation at Step 1, thereby the amount of calculation can be reduced. According to the present embodiment, the temperature change in the casing is corrected and the positioning between the heat element and the write element can be accurately performed, thereby the storage capacity of the thermal assisted type magnetic disk apparatus can be greatly increased.

Figure 15:
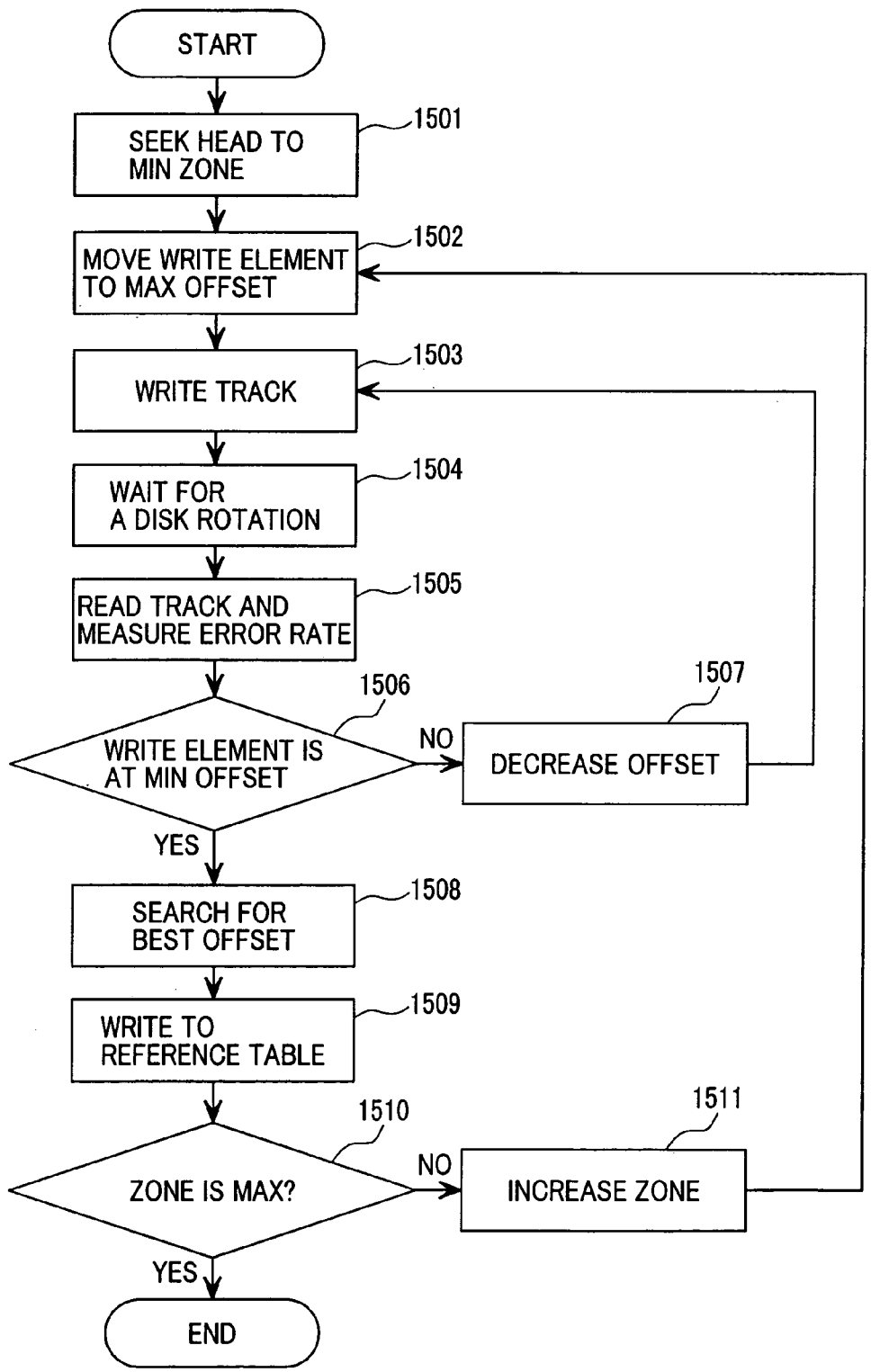
FIG. 15 is a flowchart showing a method for adjusting the conversion table by the servo circuit according to the present invention.

The process of generating the reference table by the second servo circuit of the present invention will be described with reference to the flowchart of FIG. 15. The generation of the reference table is performed in a manufacturing process of the disk apparatus. The magnetic disk apparatus employed here has a head including a write element provided with an offsetting mechanism and a fixed heat element. First, the head is caused to seek to the outmost peripheral position, zone number 13 (1501). Next, the offsetting mechanism is driven to move the write element to a maximum offset position (1502). In this state, a writing operation is performed (1503), and after waiting for rotation (1504), a reading operation is performed so as to detect an error rate (1505). Next, the offset position of the write element is moved in a negative direction by a slight distance (1507), the operation is repeated from the writing at step 1503 until the offset position becomes a minimum offset position (maximum negative offset position) (1506). In a case where the position of the write element and that of the heat element are shifted in the track width direction, as the coercivity of the disk is not reduced, the magnetic field generated by the write element becomes insufficient and the writing operation becomes deficient, thus a sufficient bit error rate cannot be obtained. A position where an optimum bit error rate can be obtained is calculated by interpolation from the slope of error rate change, and a condition of an output value to bring the position of the write element and an output value of the heat element into correspondence is found (1508). This position is written as an optimum offset position into the reference table (1509). Next, the radial position of the head is caused to seek to an adjacent inner peripheral side zone number, then the operation is repeated from step 1502 until the head reaches an innermost zone (1510). Then the process ends. According to the present embodiment, the positioning between the heat element and the write element can be accurately performed without attachment error at apparatus assembly process and the influence of tolerance in wafer process, thereby the storage capacity of the thermal assisted type magnetic disk apparatus can be greatly increased. Note that in the present embodiment, the reference table is generated by adjusting based on the offset position and the radial position, however, the present invention is not limited to this process since there are various conditions for obtaining an optimum bit error rate. For example, the error rate can be further improved and the storage capacity of the thermal assisted type magnetic disk apparatus can be further increased by generating a table for each of items such as a casing temperature and an input energy of the heat element. Further, in the present embodiment, an off-track arrangement for adjusting while offsetting the write element is described, however, at a process of adjusting while offsetting the heat element, similar advantages can be obtained.

Figure 16A:
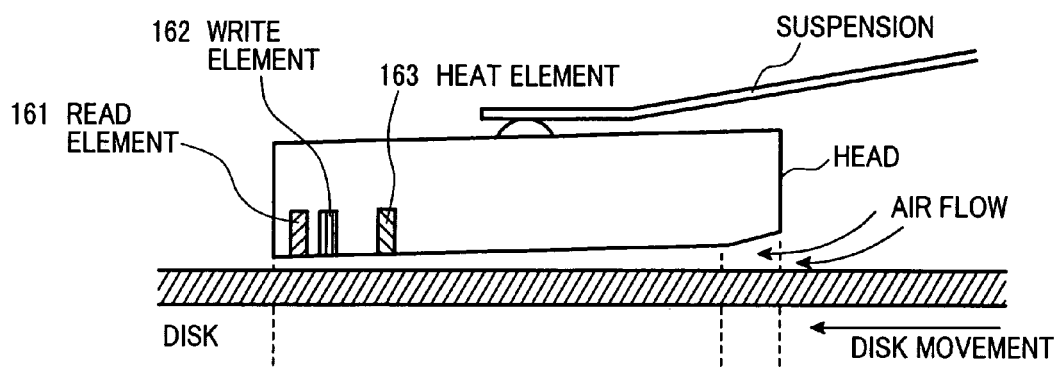
FIG. 16A is a cross-sectional view showing the structure of the magnetic head according to another embodiment of the present invention.
Figure 16B:
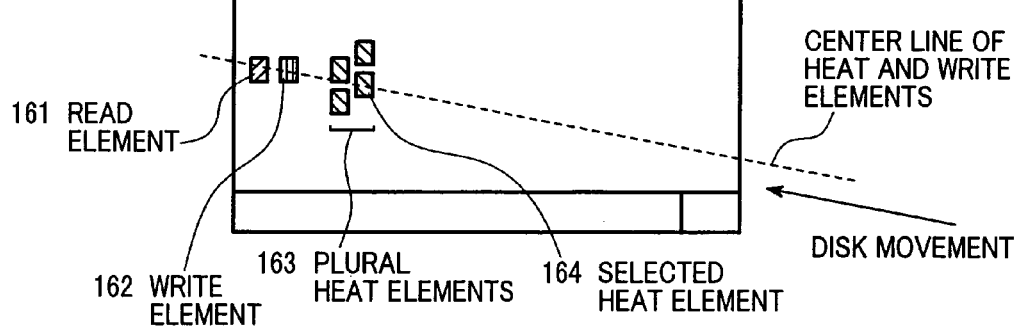
FIG. 16B is a plan view of the magnetic head viewed from the disk side.

FIGS. 16A and 16B show the structure of the head according to another embodiment of the present invention. FIG. 16A is a cross-sectional view of the magnetic head viewed from a side position, in which a head 26 is supported by a suspension, and is floated on the rotating disk 12 with a predetermined interval from the disk. The disk 12 runs in a right-to-left direction in the figure. The head 26 has a read element 161 to detect magnetic information recorded on the disk, a write element 162 to generate a magnetic field to write the magnetic information on the disk, and a heat element 163 to locally heat the disk upon writing of the magnetic information on the disk. FIG. 16B is a plan view of the head 26 viewed from the disk 12 side. The feature of the present embodiment is that plural heat elements are provided, different from the arrangement as described in FIG. 1 where one heat element is moved by use of the offsetting mechanism. Elements having heating functions such as semiconductor laser elements are arrayed, and the same read and write elements as the conventional read and write elements are employed. The head of the present embodiment is realized in this manner.

In this example, the head 26 is slanted to the direction of movement of the disk 12 while the head 26 is moved in the radial direction of the disk 12 by the rotary actuator 13. In the conventional art, the problem is that the center line of the heat element and the center line of the write element are shifted from each other as described in FIG. 7. In the head of the present embodiment, as one heat element 164 from the plural heat elements 163 is selected and operated, the center line of the heat element 164 and the center line of the write element 162 can be brought into correspondence. Upon writing, the coercivity of the disk is reduced and a magnetic pattern can be easily formed, and after the writing, the coercivity of the disk is increased and the magnetic pattern is stabilized. Further, even if a heat element with a narrow width is used, as the center line of the heat element and that of the write element accurately correspond with each other, spread of the width of recording area can be mitigated and a narrow track-width magnetic pattern can be formed. In this arrangement, a large capacity and highly-reliable magnetic disk apparatus, appropriate for long-term data storage, can be realized.

Figure 17:
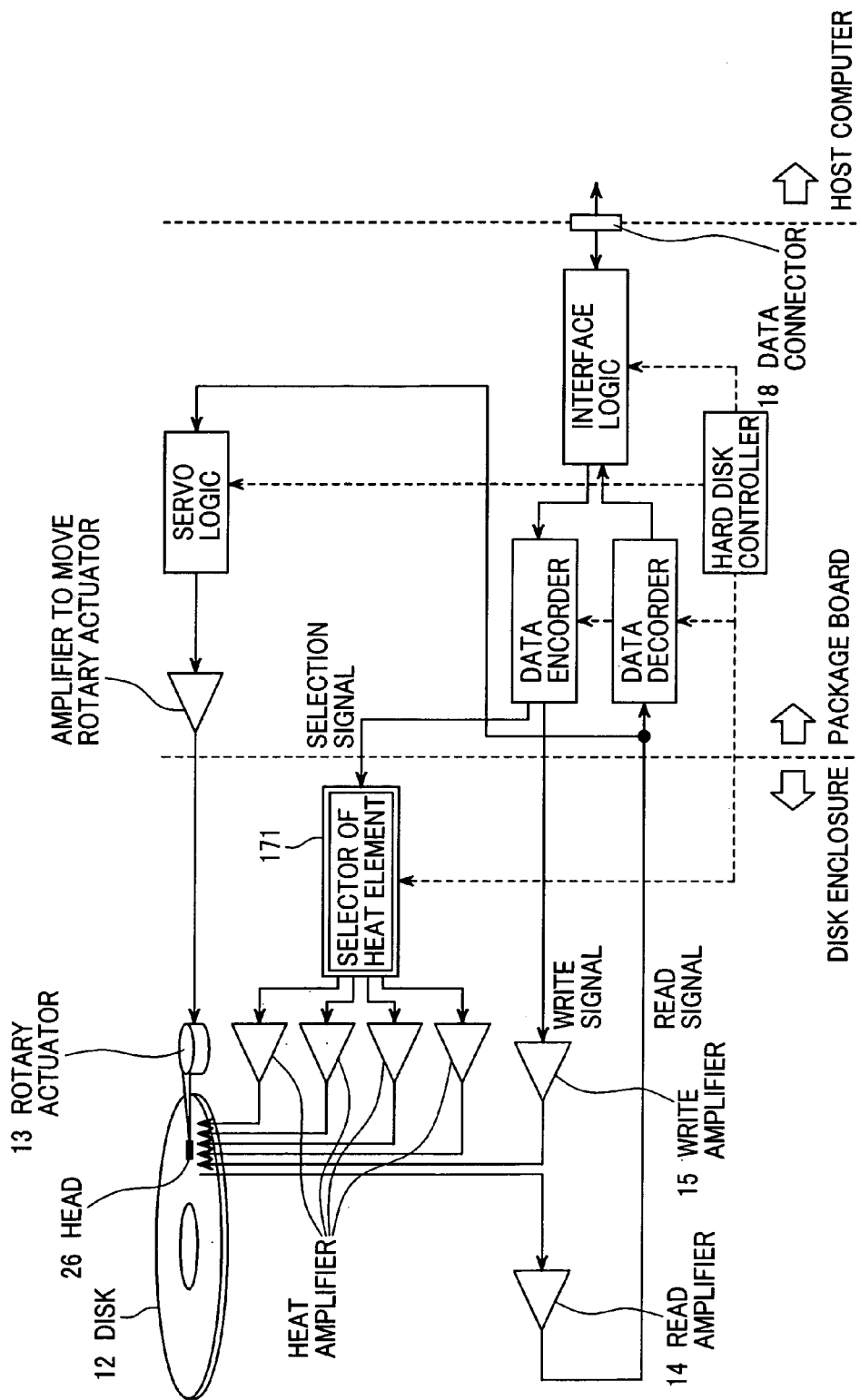
FIG. 17 is a block diagram showing the functional construction of the magnetic disk apparatus according to the other embodiment of the present invention.

FIG. 17 is a block diagram showing the functional construction of the magnetic disk apparatus according to the present embodiment of the present invention. In addition to the conventional write amplifier, heat amplifiers corresponding to the number of the heat elements are provided. When a control circuit gives designation of a target data track to the servo circuit, the servo circuit drives the rotary actuator to move the position of the head 26. Prior to writing operation, the control circuit selects an optimum heat element having a center line corresponding to the center line of the write element, in correspondence with a relative angle between the head 26 and the disk 12. The control circuit drives the write amplifier and at the same time operates the heat amplifier selected by a selector of heat element 171 to start a writing process.

At this time, as in the case of the methodology described in the previous embodiment, an optimum heat element can be more accurately selected using a reference table. Further, it may be arranged such that an adjusting function may be added for, when an environmental temperature or a target track has changed, repeating the writing and reading operations while changing the heat element and writing the number of an optimum heat element into the reference table. After the adjusting, an optimum heat element can be reliably selected by reading a value from the reference table in correspondence with a value of environmental temperature or a numerical value of target track.

Figure 18:
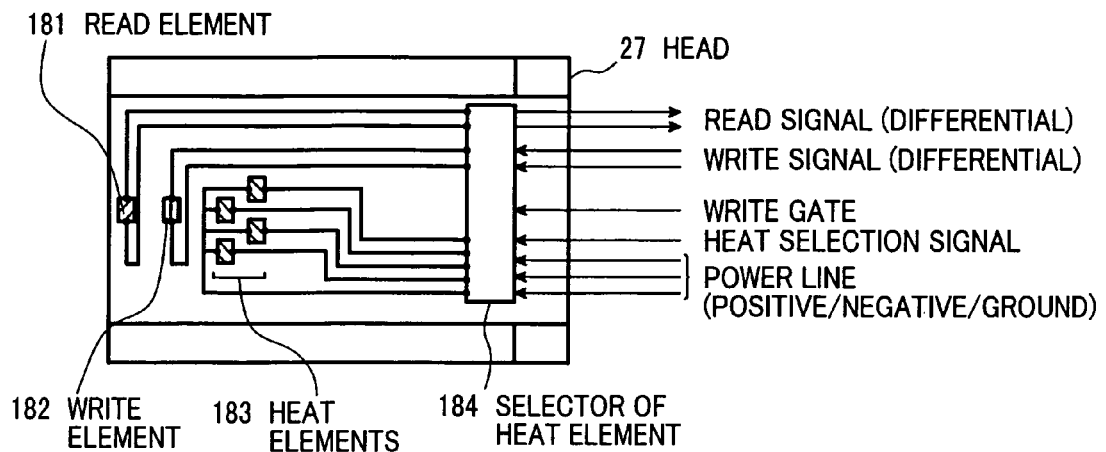
FIG. 18 is a block diagram showing the construction of the magnetic head holding a heat element selector according to another embodiment of the present invention.

FIG. 18 is a block diagram showing the construction of the head according to another embodiment of the present invention. This figure shows a head 27 from the disk 12 side. In this construction, a selector of heat element 184 is mounted, with plural heat elements 183, on the head 27. The heat element selector 184 is connected to a write gate and heat selection signal from the outside. The heat element selector 184 is further connected to a read signal to buffer an output from the read element and output it to the outside, a write signal to input information to modulate the write magnetic field generated by the write element, and a power line. This construction has a drawback that the power line is required, in comparison with the construction of the head 26 of the previous embodiment, however, the number of signal lines on the suspension connecting the heat elements 183 and the heat amplifier is reduced, and designing of the head and the suspension can be easily made. To increase a track density, it is necessary to precisely control a heating position. For this purpose, it is advantageous to employ the construction of the present embodiment in use of many arrayed heat elements. In a case where only a small number (e.g., 4) of heat elements are arrayed, the construction of the head is more complicated, however, various functional elements are mounted on the head. For example, in a case where an element to correct a floating amount, a ROM for storing a lot number and the like are mounted, if functions of controlling these elements are installed in the heat element selector 184, the present embodiment having the feature that the number of signal lines on the suspension is reduced is more advantageous.

Figure 19:
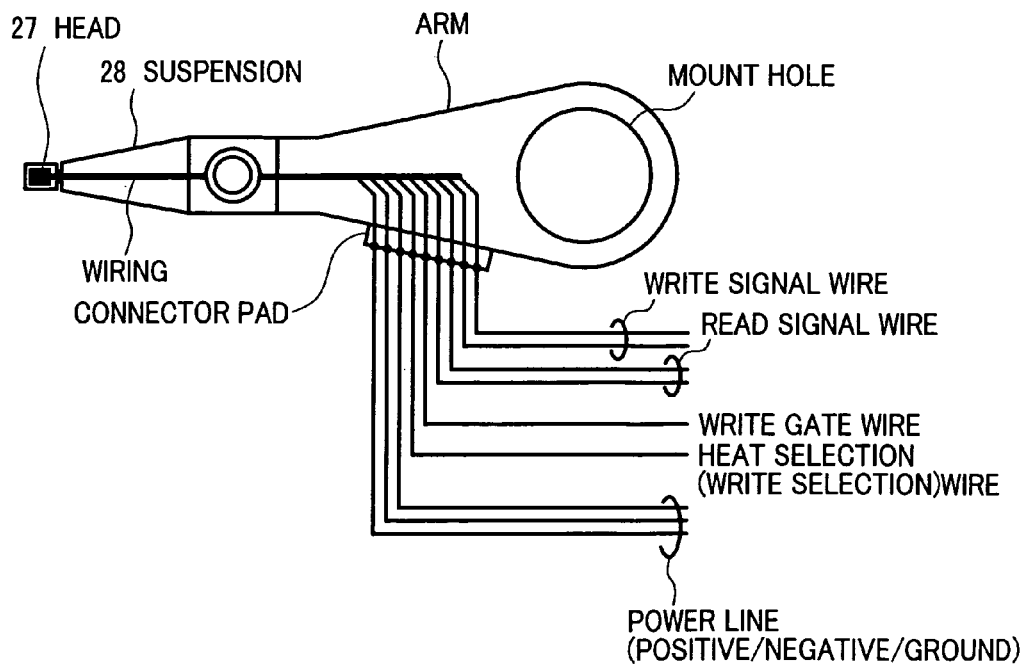
FIG. 19 is an explanatory view showing wiring of the magnetic head and a suspension according to the other embodiment of the present invention.

FIG. 19 shows the construction of the suspension appropriate to the present embodiment. This suspension 28 has connector pads for 6 signal lines corresponding to the wirings of the heat element selector 184 and 3 power lines.

Figure 20:
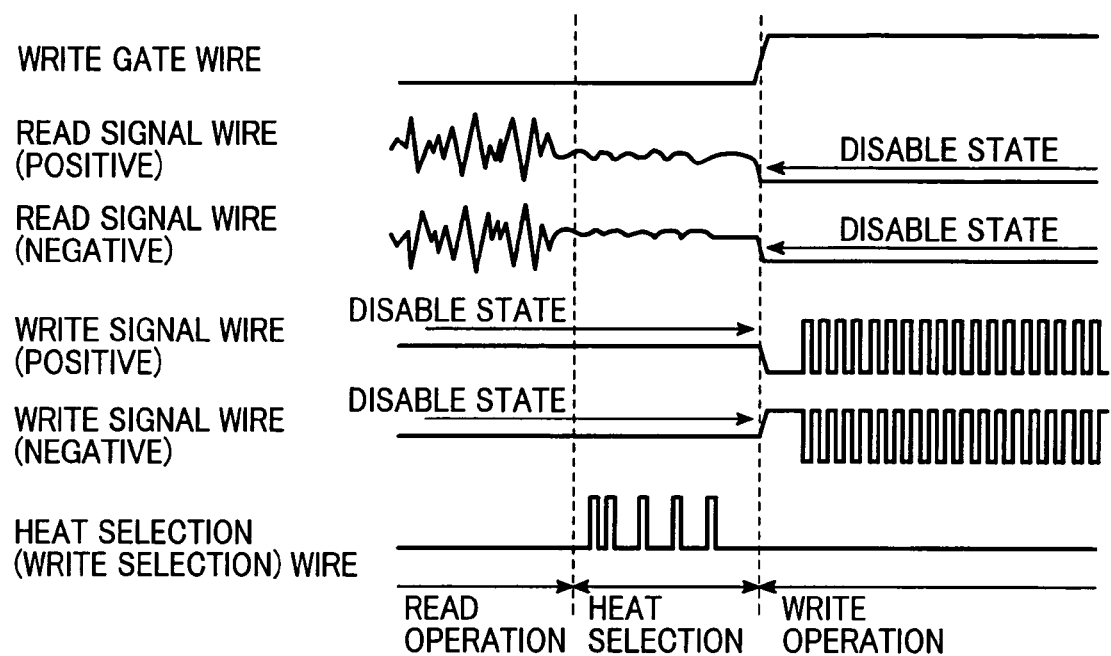
FIG. 20 is a timing chart showing signal line control and operation mode switching according to the other embodiment of the present invention.

FIG. 20 is a timing chart showing transition of information on the respective 6 signal lines. On the write gate wire, the reading operation is performed at a low potential while the writing operation is performed at a high potential. In the left half of the timing chart corresponding to the reading operation, a signal read from magnetic information on the disk is outputted on the read signal wire. The read signal is sent to the data decoder. Prior to transition from the reading operation to the writing operation, heat selection information is inputted. This information is transmitted by asynchronous serial transfer not requiring a clock. After completion of transfer of the heat selection signal, the write gate is set to the high potential, and the writing operation is started. Thereafter, a write signal is inputted.

Figure 21A:
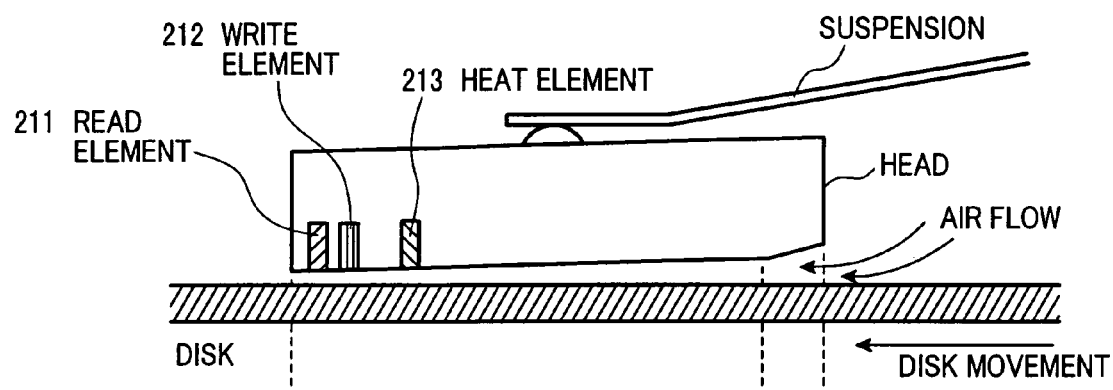
FIG. 21A is a cross-sectional view showing the structure of the magnetic head according to another embodiment of the present invention.
Figure 21B:
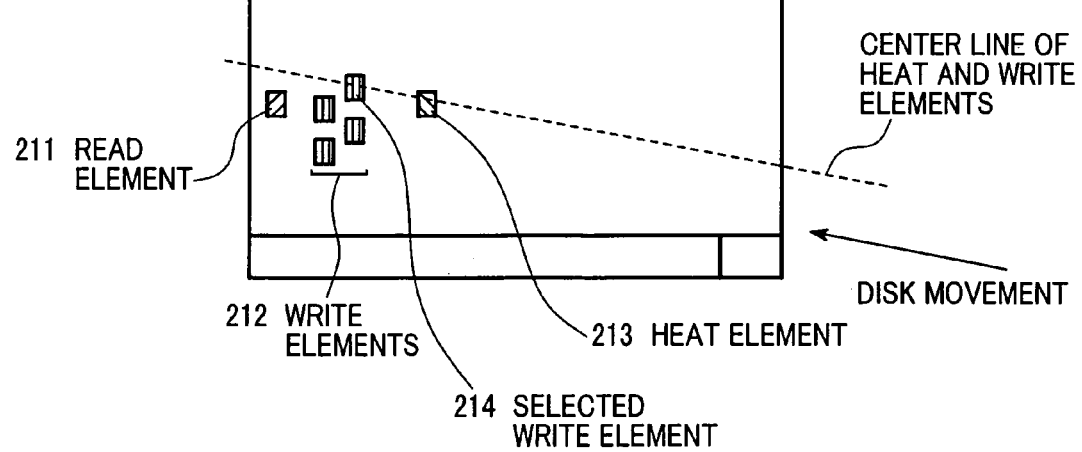
FIG. 21B is a plan view of the magnetic head viewed from the disk side.

FIGS. 21A and 21B show the structure of the head according to another embodiment of the present invention. FIG. 21A is a cross-sectional view of a head 29 viewed from a side position. FIG. 21B is a plan view of the head 29 viewed from the disk 12 side. The head 29 has a read element 211 to detect magnetic information recorded on the disk, a write element 212 to generate a magnetic field to write the magnetic information on the disk, and a heat element 213 to locally heat the disk upon writing of the magnetic information on the disk. In the present embodiment, plural write elements 212 are provided, different from the arrangement described in FIG. 8 where one write element is moved by the offsetting mechanism. The same element as the conventional write element can be used as the write element 212, however, to precisely control a writing position, the write elements must be arrayed closely to each other. In the head of the present embodiment, the write elements are arrayed in up-and-down directions in addition to the width direction. The same element as the read element in the conventional disk apparatus can be used as the read element.

In the present embodiment, the head 29 is slanted to the direction of movement of the disk 12 while the head 29 is moved in the radial direction of the disk 12 by the rotary actuator 13. In the head of the present embodiment, as one write element 214 from the plural write elements 212 is selected and operated, the center line of the heat element and the center line of the write element can be brought into correspondence. In the present embodiment, as in the previous embodiment described in FIG. 16, a large capacity and highly-reliable magnetic disk apparatus can be realized.

Figure 22:
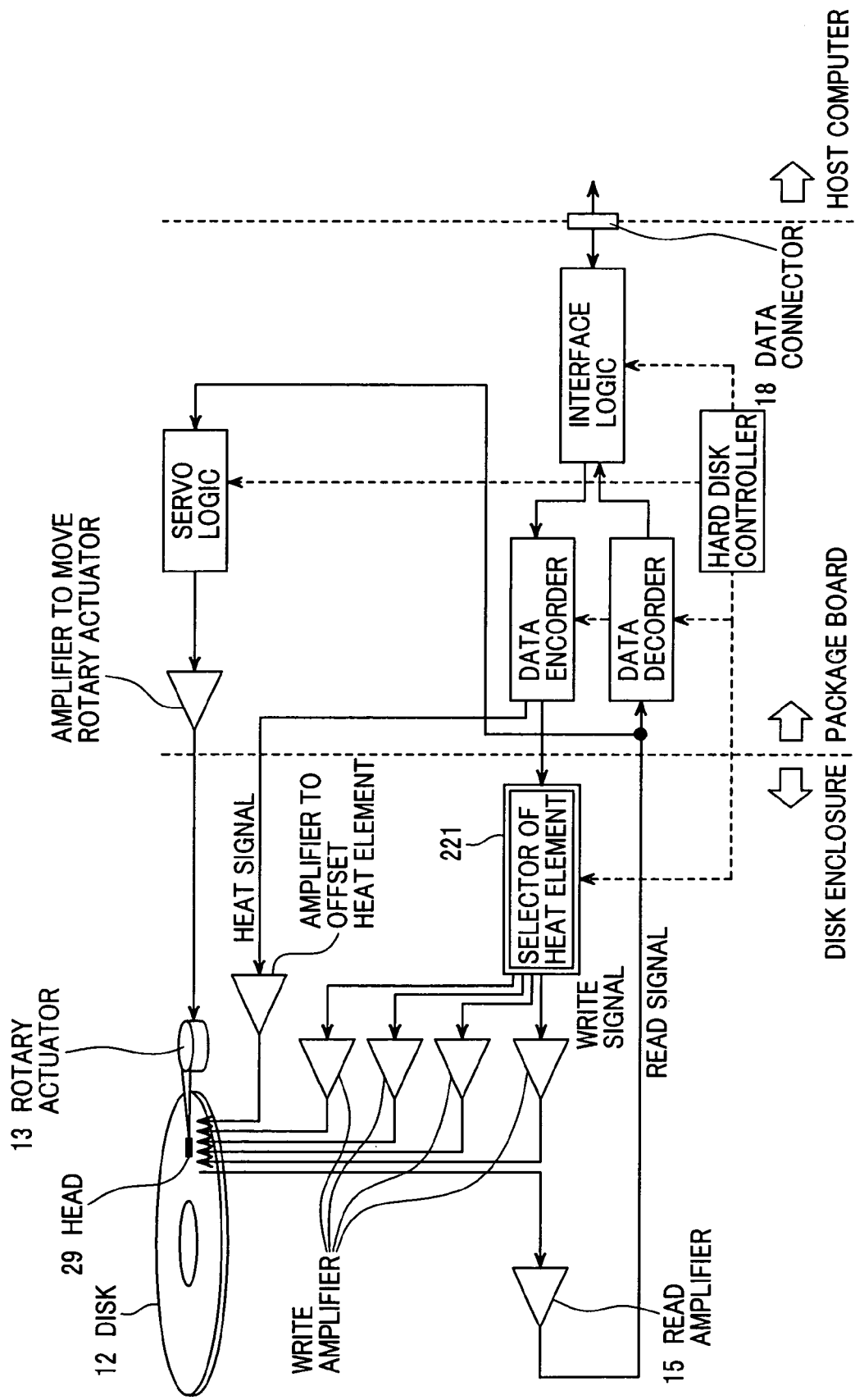
FIG. 22 is a block diagram showing the functional construction of the magnetic disk apparatus according to the other embodiment of the present invention.

FIG. 22 is a block diagram showing the functional construction of the magnetic disk apparatus according to the present embodiment. In the present embodiment, plural write amplifiers corresponding to the number of the write elements and an amplifier to offset heat element are provided. Prior to writing operation, the control circuit selects an optimum write element with its center line corresponding with the center line of the heat element, in correspondence with a relative angle between the head 29 and the disk 12, and causes a selector of write element 221 to selectively drive the amplifier. In the present embodiment, an optimum write element corresponding to a value of environmental temperature and a track position can be more reliably selected by use of the methodology using the reference table and the methodology of adjusting process.

Figure 23:
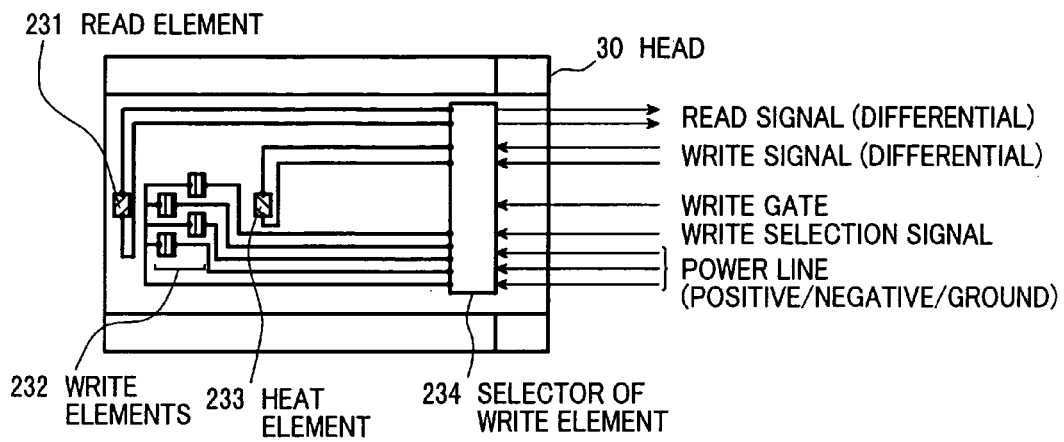
FIG. 23 is a block diagram showing the construction of the magnetic head holding a write element selector according to another embodiment of the present invention.

FIG. 23 is a block diagram showing the construction of the head according to another embodiment of the present invention. This figure shows a head 30 viewed from the disk 12 side. In this construction, plural write elements 232 and a selector of write element 234 is mounted on the head 30. The selector of write element 234 is connected to the write gate and write selection signal from the outside. Further, the selector 234 is connected to the read signal to buffer an output from the read element and output it to the outside, the write signal to input information to modulate the write magnetic field generated by the write element, and the power line. This construction has a drawback that the power source is required in comparison with the construction of the head 29 of the embodiment described in FIG. 22, however, the number of signal lines on the suspension connecting the write elements and the amplifier to offset write element is reduced, and the head and suspension can be easily designed. In the present embodiment, a highly-reliable and large capacity thermal assisted type magnetic disk apparatus can be provided by use of the suspension described in FIG. 19 and the control method for the respective signal lines described in FIG. 20.

Figure 25:
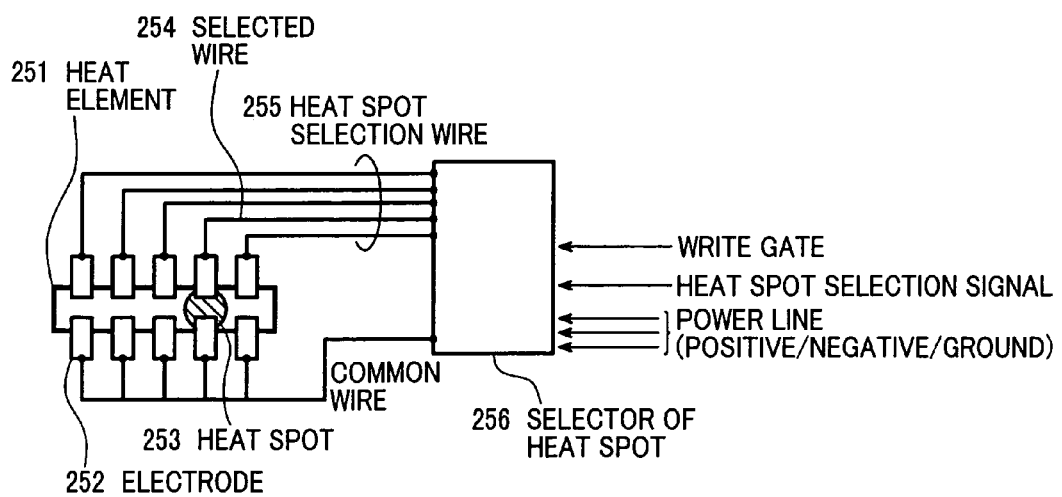
FIG. 25 is a block diagram showing wiring of the heated portion selector and respective elements according to the other embodiment of the present invention.
Figure 24A:
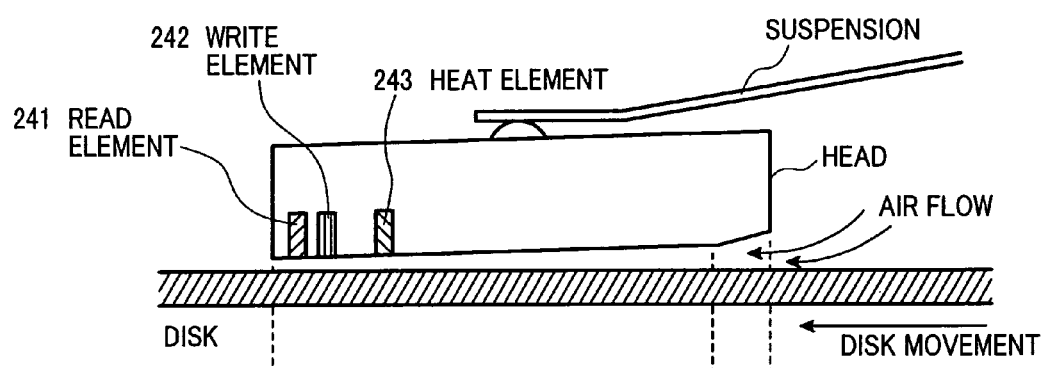
FIG. 24A is a cross-sectional view showing the structure of the magnetic head according to another embodiment of the present invention.
Figure 24B:
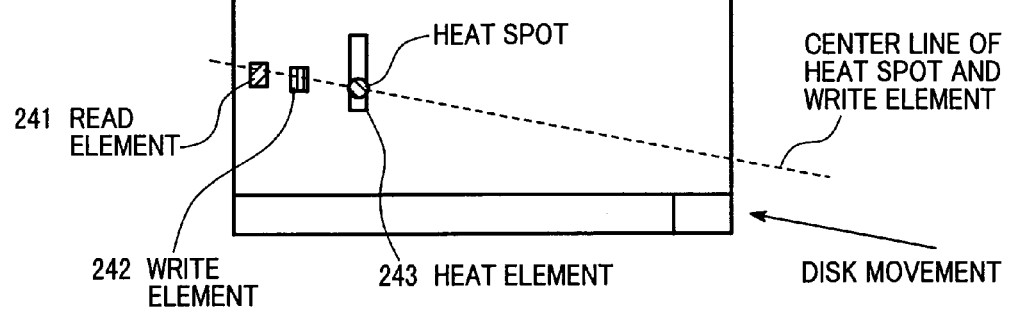
FIG. 24B is a plan view of the magnetic head viewed from the disk side.

FIGS. 24A and 24B shows the structure of the head according to another embodiment of the present invention. FIG. 24A is a cross-sectional view of a head 31 viewed from a side position. FIG. 24B is a plan view of the head 31 viewed from the disk 12 side. The head 31 has a read element 241 to detect magnetic information recorded on the disk, a write element 242 to generate a magnetic field to write the magnetic information on the disk, and a heat element 243 to locally heat the disk upon writing of the magnetic information on the disk. In the present embodiment, the heat element is capable of selectively controlling a heating position. In comparison with the construction described in FIG. 16 having plural heat elements, the heat element of the present embodiment has a comparatively larger width. Further, the present construction has a drawback that the structure of the one heat element is complicated in comparison with the construction where plural heat elements are arrayed and the construction where plural write elements are arrayed, however, the structure of the head is simple and can be easily designed. FIG. 25 shows the construction of the heat element of the present embodiment. A heat element 251 having a heating function such as a semiconductor laser is connected to plural electrodes 252. A selector of heat spot 256 applies an output from a heat amplifier to a particular electrode, thereby a heating position in the heat element can be freely selected. Note that the head of the present embodiment can be realized using the same elements as the read element and the write element of the conventional magnetic disk apparatus. In the present embodiment, the center line of the heat element and the center line of the write element can be accurately brought into correspondence by selectively heating a part of the heat element. Thus a large capacity and highly-reliable magnetic disk apparatus can be realized.

Hereinbelow, the constructions and advantages of the above-described respective embodiments will be described.

According to one embodiment of the present invention, provided is a magnetic disk apparatus comprising: a magnetic disk holding data by magnetic information on magnetic recording film; a magnetic head having a heat element to locally heat the magnetic disk, a write element to apply a magnetic field modulated by an electric signal to an area heated by the heat element, and a read element to convert the magnetic information on the magnetic disk into an electric signal; a rotary actuator to move the magnetic head along in a radial direction of the magnetic disk; a first servo circuit to detect a position of the head in the radial direction of the magnetic disk from the servo area and drive the rotary actuator; a heat area offsetting mechanism to relatively move the position of the area heated by the heat element in a width direction of a slider; and a second servo circuit to drive the heat area offsetting mechanism. The second servo circuit drives the heat area offsetting mechanism in correspondence with a relative angle between the magnetic head and a direction of movement of the disk so as to move the position of the area heated by the heat element and the position of the write element on the same track. In this construction, when the head is moved in the radial direction of the disk and a yaw angle is changed, positioning of the heat element and the write element can be accurately made on a target track of writing. As a very small disk area can be heated by the heat element and further a very small write pattern, determined by the shape of the write element can be formed on the disk, the storage capacity of the magnetic disk apparatus can be greatly improved.

According to another embodiment of the present invention, provided is a magnetic disk apparatus having a construction different from the above construction in that a write element offsetting mechanism to move the position of the write element in the width direction of the slider and the second servo circuit to drive the write element offsetting mechanism are provided. The second servo circuit drives the write element offsetting mechanism in correspondence with a relative angle between the magnetic head and the direction of movement of the disk so as to move the position of the area heated by the heat element and the position of the write element on the same track. In this construction, when the head is moved in the radial direction of the disk and a yaw angle is changed, positioning of the heat element and the write element can be accurately made on a target track of writing. As a very small disk area can be heated by the heat element and further a very small write pattern, determined by the shape of the write element can be formed on the disk, the storage capacity of the magnetic disk apparatus can be greatly improved.

According to further another embodiment of the present invention, the heat area offsetting mechanism or the write element offsetting mechanism comprises a piezo element and an elastic member deformed by the piezo element. With this construction, a magnetic disk apparatus, in which the second servo circuit drives the piezo element, to move the heat area or the write element in the width direction of the slider, can be provided. In this construction, as the heat area offsetting mechanism or the write element offsetting mechanism can be integrated on the slider of the head, the head can be downsized and light-weighted in comparison with a construction where the offsetting mechanism is provided separately from the slider, and a large capacity and high-speed magnetic disk apparatus can be realized.

According to further another embodiment of the present invention, the heat area offsetting mechanism or the write element offsetting mechanism comprises a voice coil motor. With this construction, a magnetic disk apparatus in which the heat element or the write element is moved in the width direction of the slider can be provided. In this construction, as the heat element offsetting mechanism or the write element offsetting mechanism can be integrated on the slider of the head, the head can be downsized and light-weighted in comparison with a construction where the offsetting mechanism is provided separately from the slider, and a large capacity and high-speed magnetic disk apparatus can be realized.

According to further another embodiment of the present invention, the heat area offsetting mechanism or the write element offsetting mechanism comprises a capacitance actuator. With this construction, a magnetic disk apparatus in which the heat area or the write element is moved in the width direction of the slider can be provided. In this construction, as the heat area offsetting mechanism or the write element offsetting mechanism can be integrated on the slider of the head, the head can be downsized and light-weighted in comparison with a construction where the offsetting mechanism is provided separately from the slider, and a large capacity and high-speed magnetic disk apparatus can be realized.

According to further another embodiment of the present invention, the heat area offsetting mechanism or the write element offsetting mechanism comprises a heat deformation element and an elastic member deformed by the heat deformation element. With this construction, a magnetic disk apparatus in which the write element is moved in the width direction of the slider can be provided. In this construction, as the heat area offsetting mechanism or the write element offsetting mechanism can be integrated on the slider of the head, the head can be downsized and light-weighted in comparison with a construction where the offsetting mechanism is provided separately from the slider, and a large capacity and high-speed magnetic disk apparatus can be realized.

According to further another embodiment of the present invention, the heat area offsetting mechanism comprises a heating light source and a mirror movable by a driving element on the slider. With this construction, a magnetic disk apparatus in which the second servo circuit moves the position of the mirror to move the position of the heat area on the magnetic disk in the width direction of the slider, can be provided. In this construction, as the heating light source can be positioned away from the read element and the write element, degradation of performance of the read element and the write element due to heat generation by the heating light source can be prevented, and the reliability of the magnetic disk apparatus can be improved.

According to further another embodiment of the present invention, provided is a magnetic disk apparatus in which at least 2 drive wirings are provided between the second servo circuit and the heat area offsetting mechanism or the write element offsetting mechanism. In this construction, as the second servo circuit can electrically controls the amount of movement of the heat area or the write element, a very small write pattern can be formed on the magnetic disk, and the storage capacity of the magnetic disk apparatus can be improved.

According to further another embodiment of the present invention, provided is a magnetic disk apparatus having a conversion table between an output value to the heat area offsetting mechanism or the write element offsetting mechanism and the distance of movement of the heat area or the write element in the width direction of the slider, in which the second servo circuit refers to the conversion table and determines the output value in correspondence with the position of the magnetic head in the radial direction of the magnetic disk. In this construction, as the second servo circuit can accurately control the amount of movement of the heat area or the write element in correspondence with a yaw angle of the head or the radial position of the head, a very small write pattern can be formed on the magnetic disk, and the storage capacity of the magnetic disk apparatus can be improved.

According to further another embodiment of the present invention, provided is a magnetic disk apparatus having a conversion table between an output value to the heat area offsetting mechanism or the write element offsetting mechanism and the distance of movement of the heat area or the write element in the width direction of the slider, in which writing and reading processing is performed while the position of the magnetic head is changed in the radial direction in the magnetic disk, and the writing and reading processing is performed while the output value to the heat area offsetting mechanism or the write element offsetting mechanism is changed in the respective radial position, thereby conversion data of the conversion data is adjusted. In this construction, as the tolerance in apparatus assembly or head process, and the influence by temperature can be corrected and the amount of movement of the heat area or the write element can be accurately controlled, a very small write pattern can be formed on the magnetic disk, and the storage capacity of the magnetic disk apparatus can be improved.

According to further another embodiment of the present invention, in the thermal assisted type magnetic disk apparatus, even when the yaw angle is changed along with an operation to move the head in the radial direction of the disk using a rotary actuator, the heat area and the write area can be accurately positioned on a writing target track. Accordingly, upon writing, the coercivity of the disk is reduced and a magnetic pattern can be easily formed, and after the writing, the coercivity of the disk is increased and the magnetic pattern is stabilized. With this construction, a large capacity and highly-reliable magnetic disk apparatus appropriate for long-term data storage can be realized. If it is arranged that plural heat elements and the write element are mounted on the head, a heat element selector selects an optimum heat element corresponding to the yaw angle of the head, to array the heat area and the write area in a track running direction. As a downsized and light weight head having a more simple structure can be provided, a magnetic disk apparatus with higher accessibility can be realized.

According to further another embodiment of the present invention, as the heat element selector is mounted on the head, the number of wirings of the suspension can be reduced, and a magnetic disk apparatus which can be more easily assembled at a low cost can be realized.

According to further another embodiment of the present invention, as the heat element and plural write elements are mounted on the head, a write element selector selects an optimum write element corresponding to the yaw angle of the head, to array a heat spot and a write spot in the track running direction. As the small write elements are arrayed, the positioning between the heat spot and the write spot can be accurately made. Thus a large capacity magnetic disk apparatus can be realized.

According to further another embodiment of the present invention, similarly to the above construction, as the write element selector is mounted on the head, the number of wirings on the suspension can be reduced, and a magnetic disk apparatus which can be more easily assembled at a low cost can be realized.

According to further another embodiment of the present invention, as a heat element to selectively heat a part of the element is mounted on the head, a heat spot selector selects an optimum heat spot corresponding to the yaw angle of the head, to array a heat spot and a write spot in the track running direction. As a very small disk area can be heated, and magnetic information can be formed using a very small write magnetic field generated by the write element, the storage capacity of the magnetic disk apparatus can be improved.

According to further another embodiment of the present invention, similarly to the above construction, as the heat spot selector is mounted on the head, the number of wirings on the suspension can be reduced, and a magnetic disk apparatus which can be more easily assembled at a low cost can be realized.

Further, provided is a magnetic disk apparatus comprising: a disk holding data by magnetic information on a magnetic recording film; a head to perform writing and reading of the magnetic information; a rotary actuator to move the head in a radial direction of the disk; plural heat elements to locally heat the disk in the head; a write element to apply a magnetic field to the disk in the head; and means for selecting at least one heat element from the plural heat elements, wherein the means for selecting the heat element selects at least one heat element from the plural heat elements so as to bring a center line of an area heated by the heat element and a center line of the position of the magnetic field generated by the write element into approximate correspondence, in correspondence with a relative angle between the head and a direction of movement of the disk.

Further, in the magnetic disk apparatus, the means for selecting the heat element is mounted on the head.

Further, in the magnetic disk apparatus, the means for selecting the heat element has a function of receiving heat element selection information using a serial data transfer protocol.

Further, provided is a magnetic disk apparatus comprising: a disk holding data by magnetic information on a magnetic recording film; a head to perform writing and reading of the magnetic information; a rotary actuator to move the head in a radial direction of the disk; a heat element to locally heat the disk in the head; plural write elements to apply a magnetic field to the disk in the head; and means for selecting one write element from the plural write elements, wherein the means for selecting the write element selects at least one write element from the plural write elements so as to bring a center line of an area heated by the heat element and a center line of the position of the magnetic field generated by the write element into approximate correspondence, in correspondence with a relative angle between the head and a direction of movement of the disk.

Further, in the magnetic disk apparatus, the means for selecting the write element is mounted on the head.

Further, in the magnetic disk apparatus, the means for selecting the write element has a function of receiving write element selection information using a serial data transfer protocol.

Further, provided is a magnetic disk apparatus comprising: a disk holding data by magnetic information on a magnetic recording film; a head to perform writing and reading of the magnetic information; a rotary actuator to move the head in a radial direction of the disk; a heat element to locally heat the disk in the head; a write element to apply a magnetic field to the disk in the head; and means for heating an area as a part of the heat element, wherein the means for heating the area of the heat element changes a position of the area of the heat element so as to bring a center line of an area heated by the heat element and a center line of the position of the magnetic field generated by the write element into approximate correspondence, in correspondence with a relative angle between the head and a direction of the disk.

Further, in the magnetic disk apparatus, the means for heating the area of the heat element is mounted on the head.

Further, in the magnetic disk apparatus, the means for heating the area of the heat element has a function of receiving positional information of the area heated by the heat element using a serial data transfer protocol.

According to the present invention, in a thermal assisted type magnetic disk apparatus, even when a yaw angle, caused upon movement of a head using a rotary actuator in a radial direction, has changed, a heat area and a write element can be positioned on a writing target track.

What is claimed is:

1. A magnetic disk apparatus comprising:
    a disk holding data as magnetic information on a magnetic recording film;
    a head to perform writing and reading of the magnetic information;
    a rotary actuator to move the head in a radial direction of the disk;
    plural heat elements in the head to locally heat the disk;
    a write element in the head to apply a magnetic field to the disk;
    means for selecting at least one heat element from the plural heat elements, wherein the means for selecting the heat element selects at least one heat element from the plural heat elements so as to bring a center line of an area heated by the heat element and a center line of the position of the magnetic field generated by the write element into approximate correspondence, in correspondence with a relative angle between the head and a direction of movement of the disk; and
    wherein the means for selecting the heat element has a function of receiving heat element selection information using a serial data transfer protocol.

* * * * *